(12) United States Patent
Sano et al.

(10) Patent No.: US 7,609,423 B2
(45) Date of Patent: Oct. 27, 2009

(54) SHEET TRANSFER APPARATUS HAVING A LIGHT VOLUME DETECTION MEANS FOR DETECTING A DEVIATION AMOUNT OF A SHEET AND IMAGE READING APPARATUS HAVING THE SHEET TRANSFER APPARATUS

(75) Inventors: Kazuhide Sano, Yamanashi-ken (JP); Shunichi Hirose, Minami-alps (JP)

(73) Assignees: Nisca Corporation, Minamikoma-gun, Yamanashi-ken (JP); Konica Minolta Business Technologies, Inc., Tokyo (JP)

( * ) Notice: Subject to any disclaimer, the term of this patent is extended or adjusted under 35 U.S.C. 154(b) by 809 days.

(21) Appl. No.: 10/854,194

(22) Filed: May 27, 2004

(65) Prior Publication Data

US 2005/0185229 A1 Aug. 25, 2005

(30) Foreign Application Priority Data

May 28, 2003 (JP) ............................. 2003-151062
May 20, 2004 (JP) ............................. 2004-150611

(51) Int. Cl.
*H04N 1/04* (2006.01)

(52) U.S. Cl. ...................... 358/498; 358/497; 358/449; 271/285.01; 399/371; 399/395

(58) Field of Classification Search ............ 250/559.36; 399/394, 367, 371, 372, 395, 215; 358/488, 358/479, 449, 474, 498, 497, 475; 271/10.03, 271/258.01, 265.04
See application file for complete search history.

(56) References Cited

U.S. PATENT DOCUMENTS 5,662,321 A * 9/1997 Borostyan et al. ........ 271/10.03

| | | | |
|---|---|---|---|
| 6,362,492 B1 * | 3/2002 | Meisser et al. ......... | 250/559.36 |
| 6,539,199 B1 * | 3/2003 | Miyata et al. .............. | 399/394 |
| 6,912,325 B2 * | 6/2005 | Rombola et al. ........... | 358/488 |
| 7,339,654 B2 * | 3/2008 | Mizubata et al. ......... | 271/10.03 |
| 7,347,419 B2 * | 3/2008 | Sano et al. ............. | 271/265.04 |
| 7,511,862 B2 * | 3/2009 | Sano et al. ................. | 358/474 |

FOREIGN PATENT DOCUMENTS

| JP | 6-92512 | | 4/1994 |
|---|---|---|---|
| JP | 06092512 A | * | 4/1994 |
| JP | 7-187449 | | 7/1995 |
| JP | 2002-292960 | | 10/2002 |

* cited by examiner

*Primary Examiner*—Twyler L Haskins
*Assistant Examiner*—Nicholas C Pachol
(74) *Attorney, Agent, or Firm*—Manabu Kanesaka

(57) ABSTRACT

The present invention comprises a light volume detection means for detecting the light volume according to the deviation amount at a sheet transfer position in the width direction of a sheet end to be transferred, the light volume detection mean being constituted by a light emitting element and a light receiving element having a light receiving surface of a prescribed length in the width direction of the sheet, and at least either said light receiving element or the light emitting element can be moved to a position in the sheet width direction according to the size of the sheet placed on the feed tray. Therefore, even if the size of the sheet transferred by the transfer means is different, the light volume detection means is able to detect the light volume at an adequate position according to the size of the sheet, the detection accuracy of the position deviation amount is enhanced with respect to the sheet different in size, and the accurate deviation amount can be detected.

11 Claims, 18 Drawing Sheets

(a)

(b)

FIG.12
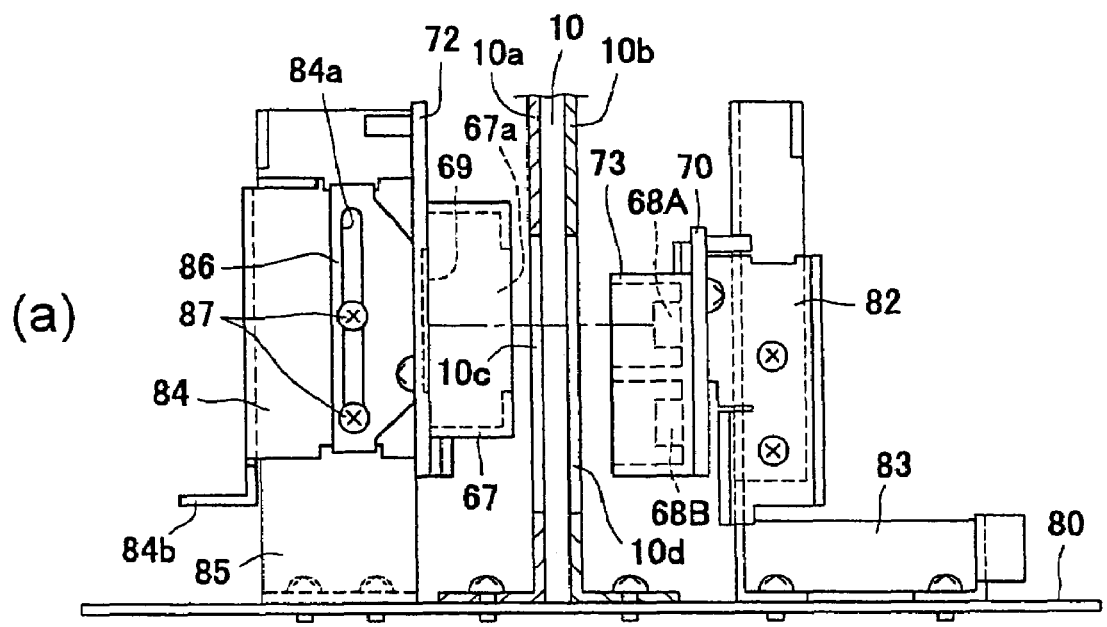
(a)
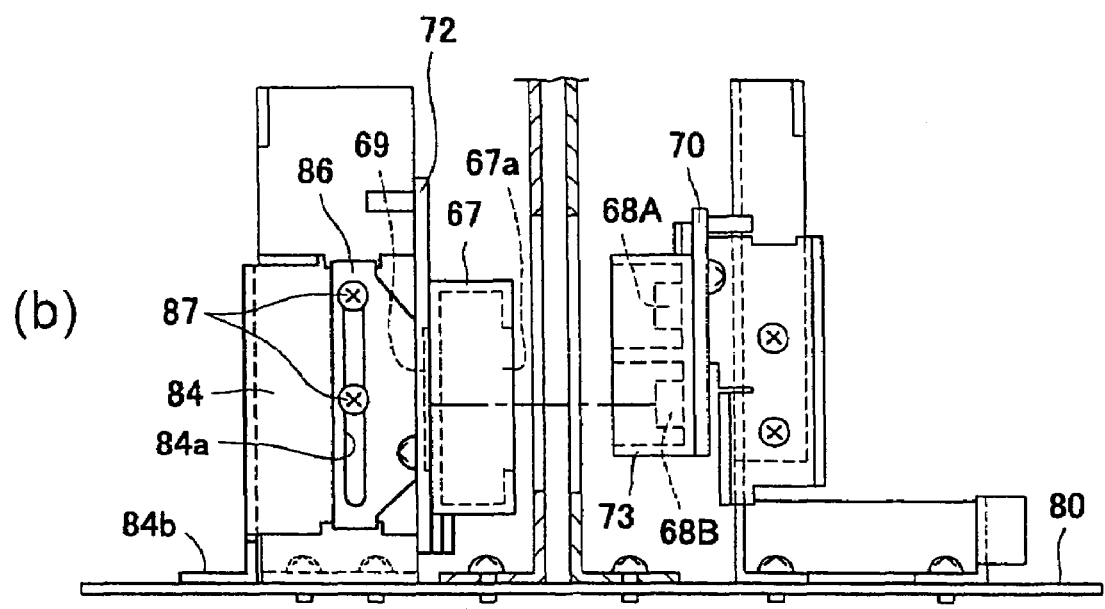
(b)

FIG.13
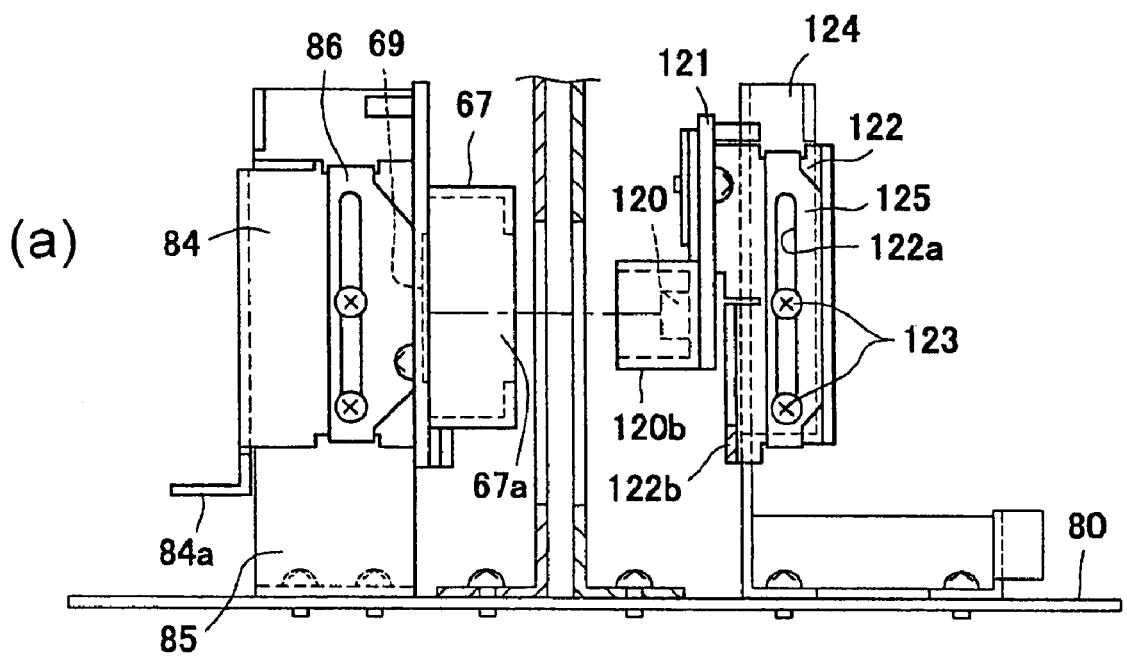
(a)
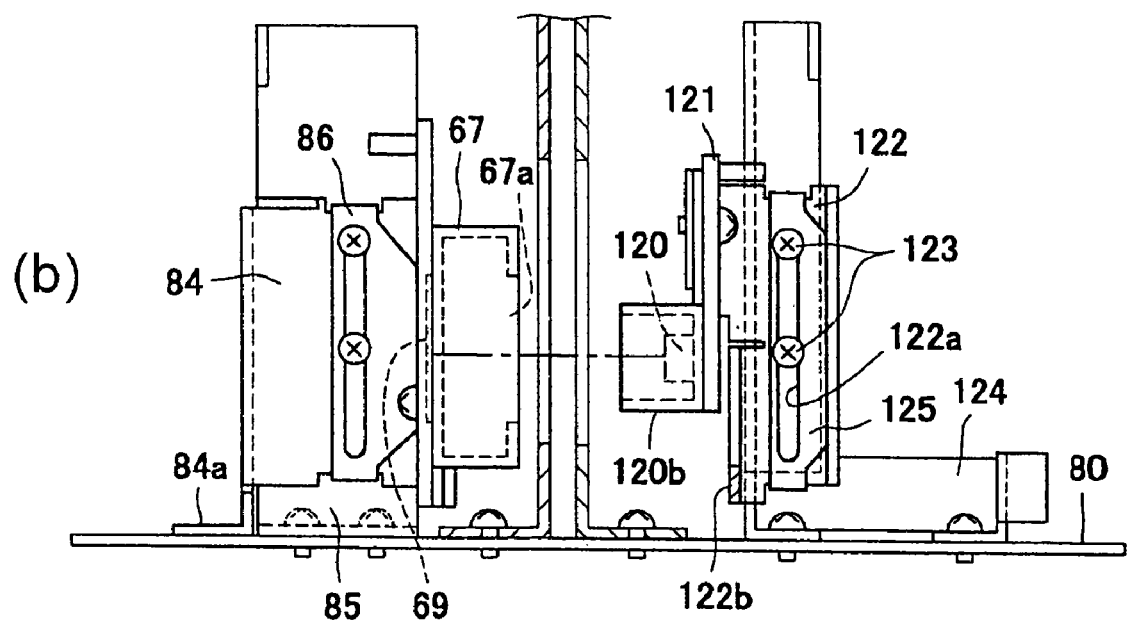
(b)

FIG.16
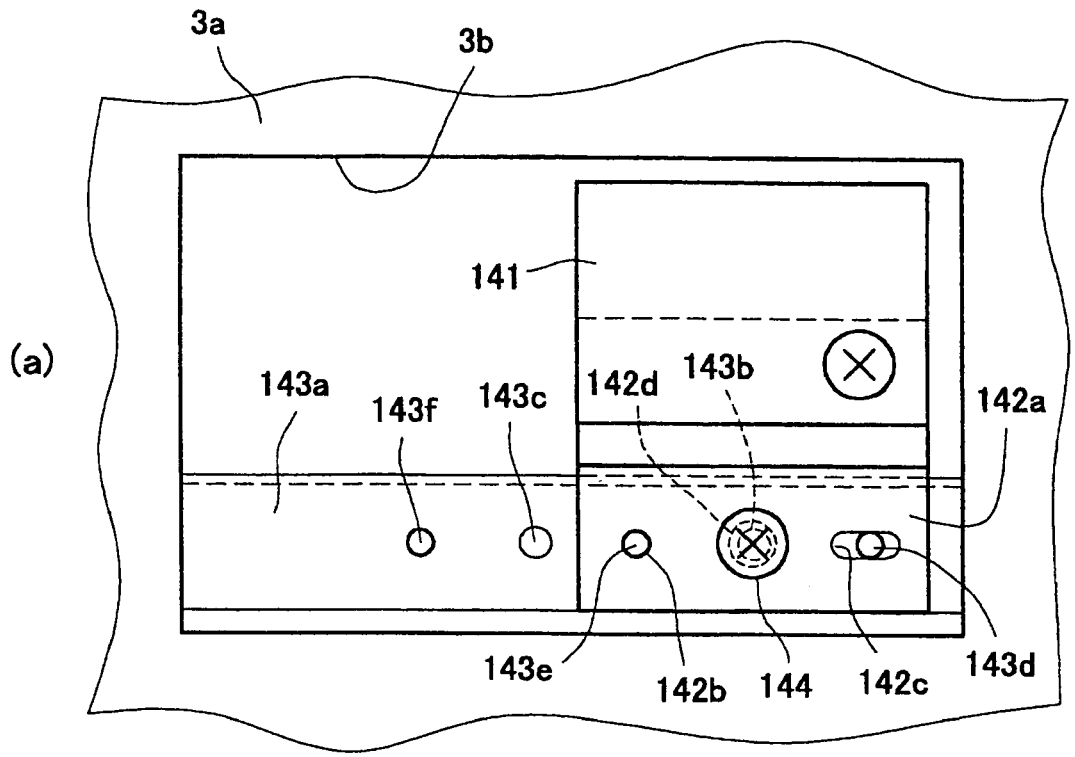
(a)
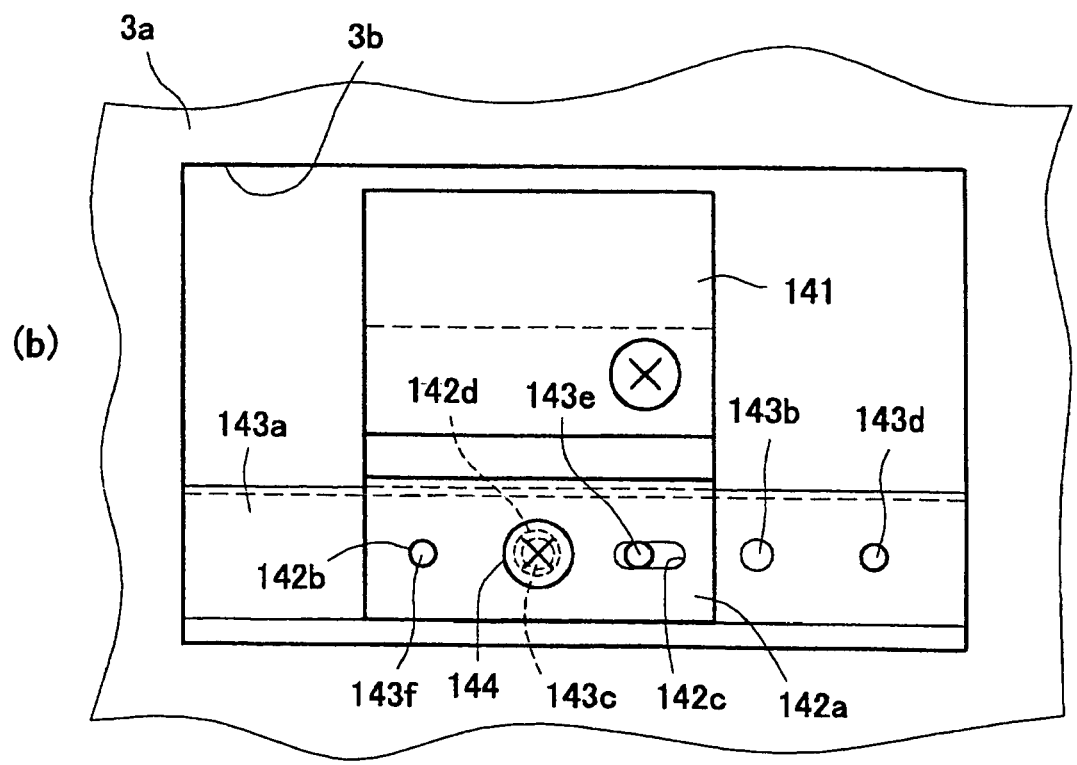
(b)

SHEET TRANSFER APPARATUS HAVING A LIGHT VOLUME DETECTION MEANS FOR DETECTING A DEVIATION AMOUNT OF A SHEET AND IMAGE READING APPARATUS HAVING THE SHEET TRANSFER APPARATUS

BACKGROUND OF THE INVENTION

1. Field of the Invention

The present invention relates to a sheet transfer apparatus for transferring a sheet to a prescribed processing position, and an image reading apparatus mounted on the sheet transfer apparatus for optically reading an image of the sheet transferred to a prescribed processing position to output read image data, and more specifically to the structure for detecting a transfer position of the sheet to be transferred to a prescribed position.

2. Description of the Related Art

Conventionally, in the sheet transfer apparatus mounted on the image reading apparatus in a copying machine, a printer or the like, the sheet is sometimes obliquely moved to arise the lateral deviation (or dislocation). When the lateral deviation of the sheet arises, an image formed on the sheet is inclined or deviated. Therefore, the procedure has been generally carried out in which the lateral deviation is detected by a sensor, and the deviation of the image is corrected on the basis of the detected result.

Further, for detecting the lateral deviation amount and correcting a write position of an image according to the lateral deviation amount, light receiving elements having many pixels such as a line sensor, an image sensor or the like represented by a photodiode array, a CCD sensor, a CMOS sensor, and a CIS sensor are used. Means for detecting the lateral deviation position by ON/OFF of every pixel are known by, for example, Japanese Patent Laid-Open No. 6 (1994)-92512 Publication, Japanese Patent Laid-Open No. 7 (1995)-187449 Publication, Japanese Patent Laid-Open No. 2002-292960 Publication, and the like. In this case, on the light emitting side, a light emitting area to the same degree as the length on the light receiving side is necessary, and therefore, parallel light is formed by using a LED array, a diffusion plate, or a lens and a slit.

However, the CCD sensor, the CMOS sensor and the like are expensive, and a circuit exclusively used for signal processing is necessary. Further, in the photodiode array, a number of minute chips are arranged in a row, and fundamentally, it has the structure similar to that of the CCD sensor or the like, resulting in increasing the cost.

Further, when the LED array, the diffusion plate, the lens or the like are used on the light emitting side in order to form the light emitting area (parallel light) to the same degree as the length of the light emitting portion, not only a large space is necessary but also the price becomes high. It is therefore contemplated that the light emitting portion is made small as compared with the light receiving portion. However, if the light emitting portion is small as compared with the light receiving portion, light from the light emitting portion to the light receiving portion is widened, and therefore where the edge of the sheet is in the center of the light source, an accurate position thereof can be obtained, whereas where the edge of the sheet is positioned to one side laterally from the center of the light source, the edge of the sheet positioned to one side laterally from the actual position is detected. The sheet and the light receiving portion have to be positioned as close as possible, in which case, however, there arises a new problem that the freedom of design is small.

Further, in the general sheet transfer apparatus, sheets of various sizes are being handled. As the systems for transferring the sheets of various sizes, there have been already known a one side reference transfer system for adjusting one end in the width direction in the sheets of all sizes to a reference position provided on one side on a feed tray to transfer the sheets, and a center reference transfer system for adjusting the center in the width direction in sheets of all sizes to the center on a feed tray.

In the one side reference transfer system, if the lateral deviation amount detection sensor is arranged in a relatively short range of a transfer channel corresponding to a reference position provided on one side on the feed tray, the detection of sheets of all sizes becomes enabled. However, in the center reference transfer system, since the transfer position of the end is different depending on the sheets of respective sizes, at least a light receiving element of the lateral deviation amount detection sensor need to have a length corresponding to a position of the end in the width direction in each sheet. Therefore, the length of the light receiving element becomes long, but the resolving power of an output voltage from a current-voltage conversion circuit is constant, and therefore the detection accuracy of the lateral deviation amount of the sheet lowers as compared with the case where the light receiving element is short (case of the lateral deviation amount detection sensor in the one side reference transfer system). Further, if approximately uniform light is not incident on the light receiving element, the detection accuracy lowers, and therefore as previously mentioned, a light emitting area (parallel light) of the same degree as the length of the light receiving element has to be formed on the light emitting side by an LED array, a diffusion plate or an lens. Thus, if the light receiving element is longer, not only a larger space is necessary but also the price becomes high.

The present invention has been accomplished paying attention to the aforementioned circumstances, and an object of the invention is to provide an apparatus in which the position deviation amount in the width direction of a transfer sheet is detected accurately and at less cost, and even if the size in the width direction of the transfer sheet is different, the position deviation amount in the width direction of the transfer sheet can be detected with high accuracy without bringing forth an increase of the number of parts and complication of the construction.

SUMMARY OF THE INVENTION

In the present invention, there is provided a light volume detection means for detecting the light volume according to the deviation amount at a sheet transfer position in the width direction of a sheet end to be transferred. The light volume detection means comprises a light emitting element and a light receiving element having a light receiving surface of a prescribed length in the width direction of the sheet, and at least either the light emitting element or the light receiving element can be moved to a position in the width direction of the sheet according to the size of the sheet placed on the feed tray. Therefore even if the size of the sheet to be transferred by the transfer means is different, the light volume detection means is able to detect the light volume at an adequate position according to the size of the sheet, the detection accuracy of the position deviation amount is enhanced with respect to the sheet which is different in size, and the accurate position deviation amount can be detected.

BRIEF DESCRIPTION OF THE DRAWING

FIG. 12 is a plan view showing the construction in which a light receiving element of the lateral deviation detection sensor is moved manually.

FIG. 13 is a plan view showing the construction in which a light receiving element and a light emitting element of the lateral deviation detection sensor is moved manually.

FIG. 16 is a view showing the state that a light receiving element is mounted in the construction in which a mounting position of a light receiving element of the lateral deviation detection sensor is changed.

DESCRIPTION OF THE PREFERRED EMBODIMENTS

One embodiment of the present invention will be described hereinafter with reference to the accompanying drawings.

Figure 1:
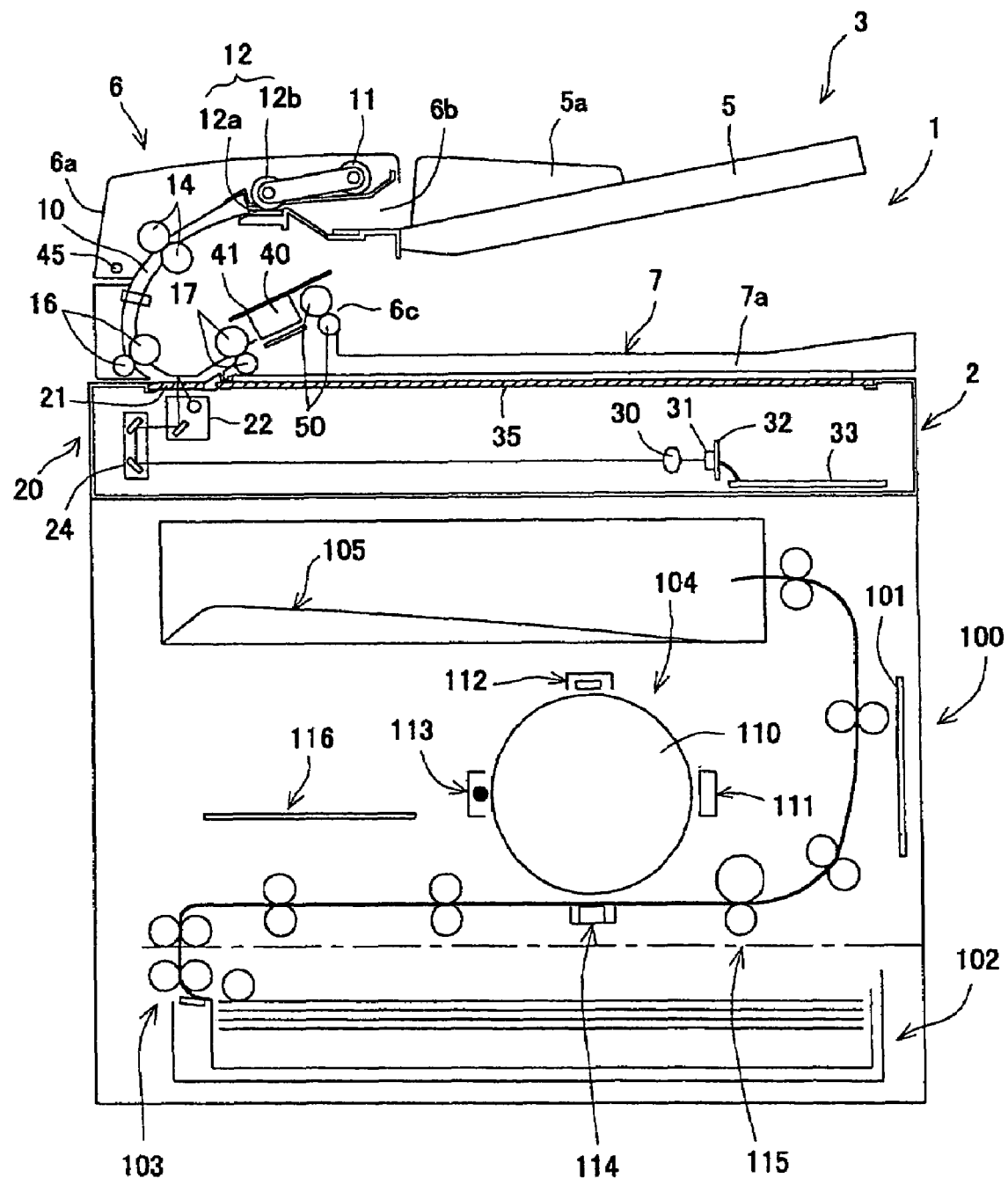
FIG. 1 is a schematic constituent view of the copying machine provided with an image reading apparatus according to one embodiment of the present invention.

FIG. 1 shows the state that an image reading apparatus 1 according to the present embodiment is mounted on a copying machine 100 which is an image forming apparatus. As shown, the image reading apparatus 1 of the present embodiment is constituted as an automatic document feed apparatus (sheet transfer apparatus) for continuously drawing out a document (sheet) to feed it to an image read section, the apparatus comprising a lower unit 2 and an upper unit 3 mounted free to open and close on the lower unit 2 by means of a hinge or the like.

The upper unit 3 comprises a feed tray 5 for laminating and receiving documents, a body 6 constituting a transfer means for transferring the document on the feed tray 5 and transferring out read processing of the document, and a discharge tray 7 jointly mounted on the feed tray to discharge the document subjected to read processing. It is noted that the documents laminated on the feed tray 5 are restricted in width direction by a feed guide 5a.

The body 6 comprises a casing 6a internally provided with a transfer channel for transferring a document, a pair of rollers for transferring a document. The casing 6a is formed with a document introducing port 6b corresponding to the feed tray 5, and formed with a document discharge port 6c corresponding to the discharge tray 7. The document introduced from the document introducing port 6b is transferred along an approximately U-shaped transfer channel 10 disposed within the casing 6a, and discharged onto the discharge tray 7 through the document discharge port 6c after having subjected to read processing.

In the vicinity of the document introducing port 6 of the casing 6a is disposed a pickup roller 11 placed in contact with the document laminated on the feed tray 5 to draw it out, and on the downstream side of the pickup roller 11 is disposed a sheet separation mechanism 12 having a separation pad 12a for positively separating the documents drawn out one by one. Further, in the transfer channel on the downstream side of the sheet separation mechanism 12 is disposed a pair of resist rollers 14 for forming the bent at the extreme end of the document separated by the sheet separation mechanism 12 to remove skew.

Further, the image reading apparatus 1 according to the present embodiment has the structure provided with two optical reading apparatuses (reading means) so that images on both surfaces of the document to be transferred may be read. Out of them, a first optical reading apparatus 20 is encased in the lower unit 2 so as to read an image of a document passing through a sheet through platen 21 positioned between a pair of transfer rollers 16, 17 disposed continuously along the transfer channel 10. More specifically, is provided with a reduced optical system sensor and having a first carriage 22 and a second carriage 24. Each of the carriages 22, 24 is driven by a motor not shown and can be moved in a lateral direction in the figure within the unit while being interlocked with each other to keep a prescribed distance relation.

Figure 2:
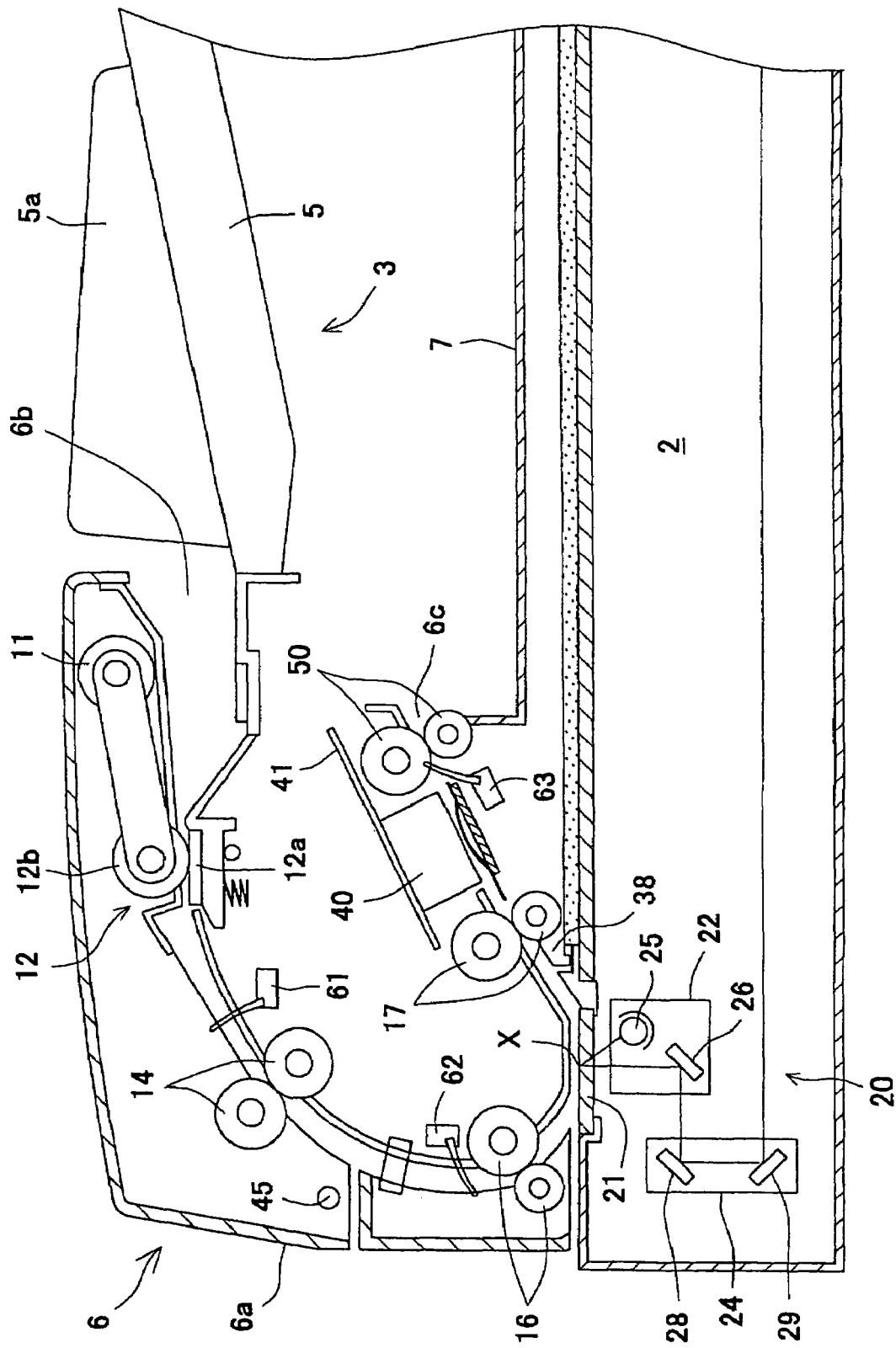
FIG. 2 is an enlarged view of main parts of the image reading apparatus of FIG. 1.

As clearly shown in FIG. 2, on the first carriage 22 are mounted a light source 25 for irradiating light on the document and a reflecting mirror 26 for receiving a reflecting light from the document to reflect it horizontally. Further, on the second carriage 24 are mounted a reflecting mirror 28 for directing a horizontal reflecting light from the reflecting mirror 26 toward the vertical direction, and a reflecting mirror 29 for directing the vertical light reflected by the reflecting mirror 28 toward the horizontal direction reversed to the reflecting light caused by the reflecting mirror 26.

Further, the second optical reading apparatus 20 has a condenser 30 fixed within the lower unit and in which the reflecting light from the reflecting mirror 29 is incident, and a CCD image sensor 31 for receiving light focused by the condenser 30. The light detected by the CCD image sensor 31 is converted into a digital signal by a CCD base plate 32, after which it is transmitted to an interface base plate 101 within the copying machine 100 through an image processing base plate 33 for transferring out various image processing.

Further, the first optical reading apparatus 20 is constituted so that even a book-type document may be read. That is, on the upper surface of the lower unit 2, a book read platen 35 is provided adjacent to the sheet through platen 21, and the document placed on the book read platen may be read by scanning due to the movement of the carriages 22, 24. Therefore, on the lower surface of the discharge tray 7 is fixedly mounted a press member 7a having elasticity for softly pressing and fixing the document placed on the book read platen 35.

On the other hand, the second optical reading apparatus 40 is provided internally of the upper unit 3 so as to read the image on the surface opposite the surface of the document read by the first optical reading apparatus 20. More specifically, the second optical reading apparatus 40 is disposed in a transfer channel linearly formed on the downstream side of the pair of transfer rollers 17 so as to read the document opposite the document dipped up by a dip-up guide 38 passing through a read position X1 of the sheet through platen 21. In the present embodiment, the second optical reading apparatus 40 is provided with an equal-fold closed type image sensor. More specifically, it is constituted as a contact image sensor (CIS) unit for encasing a light source for irradiating light on a document image, a protective glass permeating reflecting light from a document, and a CCD image sensor for detecting reflecting light from the document permeating the protective glass. In this case, the light detected by the CCD image sensor is converted into a digital signal by the circuit base plate 41, after which it is transmitted to the interface base plate 101 within the copying machine 100 through an image processing base plate 33 provided internally of the lower unit 3.

Further, on the downstream side of the second optical reading apparatus 40 is a pair of discharge roller 50, and the document subjected to read processing is discharged onto the discharge tray through the document discharge port 6c by the pair of discharge rollers 50.

It is noted that a plurality of sensors 61 to 63 for detecting a position of a document are disposed on the transfer channel 10, and on the basis of the detection signals from these sensors 61 to 63, a control circuit (not shown) controls a motor (not shown) for driving a pair of resist rollers 14, a pair of transfer rollers 16, 17, and a pair of discharge rollers 50, movement operation of the carriages 22, 24, and turn-on/off control of the light sources provided on the optical reading apparatuses 20, 40.

Next, the structure of the copying machine 100 as an image forming apparatuses shown in FIG. 1 will be briefly described.

As shown, the copying machine 100 is internally provided with a feed cassette 102 for stocking sheets as transfer material in which an image is transferred, a draw-out roller 103 for separating sheets encased in the feed cassette 102 one by one, an image forming section 104 for forming an image with respect to the drawn-out sheet, and a tray 105 for stocking sheets in which an image is formed.

The image forming section 104 is provided with a photosensitive drum 110, around of which are disposed a cleaning unit 111, a charger unit 112, a developer unit 113, and a transfer unit 114. Further, on the downstream side of the transfer unit 114 is provided a fixing unit 115 for fixing a toner image transferred to the sheet by the transfer unit 114.

The actual image forming is transferred out by initializing the photosensitive drum 110 by the cleaning unit 111, charging a charge on the circumferential surface of the photosensitive drum 110 by the charger unit 112, processing the evenly charged charge to a charge distribution in accordance with the desired image by the developer unit 113, putting a toner with carbon as a main body, and thereafter, transferring the toner formed on the photosensitive drum 110 to the sheet by the transfer unit 114 to fix it by the fixing unit 115.

Image data of the document read by the image reading apparatus 1 is received through the interfaced base plate 101 as data applied with shading correction and white correction for normalizing quantized data after A/D conversion simultaneously transferred out in the image processing base plate 33 of the image reading apparatus 1, density contrast correction for converting a value of an image into the desired brightness contrast, and trimming processing for obtaining data only in a specific area, and the data is transmitted to the developer unit 113 after having been processed on the printer base plate 116. Further, the image reading apparatus 1 is able to read both surfaces of a document, and therefore, for enabling image formation of both surfaces also in the copying machine 100 side, there is provided a switch back mechanism (not shown).

Figure 3:
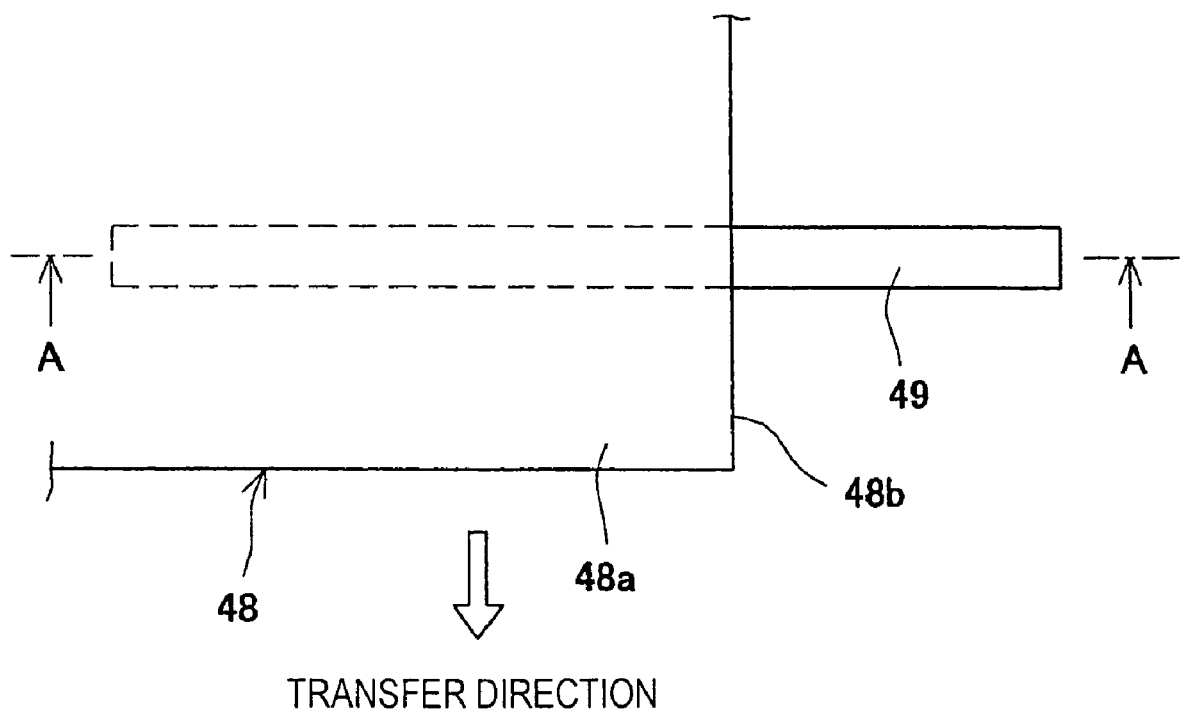
FIG. 3 is a plan view of a photodiode of a lateral deviation detection sensor as viewed from a document.

Further, as shown in FIGS. 1 and 2, in the image reading apparatus 1 according to the present embodiment, a lateral deviation detection sensor 45 as a first light detection means is provided on the downstream side of the pair of resist rollers 14 and on the upstream side of a read position X. This lateral deviation detection sensor 45 is arranged corresponding to one side of the transfer channel 10, that is, one side end position in the direction perpendicular to the transfer direction of the document to be transferred along the transfer channel 10 to optically detect the deviation amount (lateral deviation amount) of the transfer position of the one side end of he document in the direction perpendicular to the transfer direction. More specifically, as shown in FIGS. 3 and 4, the lateral deviation detection sensor 45 has a light emitting portion 46 and a light receiving portion 47 to detect the light volume according to the deviation amount of the transfer position of the one side end 48a of the document 48 in the direction perpendicular to the transfer direction (shown by the arrow in FIG. 3) in the detection area in the prescribed range.

The light receiving portion 47 is provided with a photodiode comprising one chip (hereinafter referred to as a photodiode chip) 49 having the length according to the detection area as a light emitting element, not a light receiving element having a number of pixels as in the CCD senor or the photodiode array. The light emitting portion 46 is provided with a light emitting diode as one light emitting element of wide directivity (hereinafter referred to as a wide directivity LED) capable of irradiating the detection area with uniform illuminance regarded to be equal (capable of irradiating with uniform illuminance to a degree that the whole surface of the photodiode chip 48 is regarded to be equal).

Further, a diaphragm 52 is provided between the photodiode chip 49 and the wide directivity LED 51 close to the photodiode chip 49 (away from the photodiode chip 49 by distance L1). The diaphragm 52 controls the irradiation range of light moving from the wide directivity LED 51 toward the photodiode chip 49 to decide a detection area. In the present embodiment, the diaphragm 52 has an opening 52a set to the size that the whole surface of the photodiode chip 49 is irradiated. Conversely speaking, the length of the photodiode chip 49 (length along the direction perpendicular to the transfer direction of the document 48) is set to a length capable of receiving all light having passed through the diaphragm 52. It is noted that for this length, a case where a position of the wide directivity LED 51 is deviated is also taken into consideration.

Figure 4:
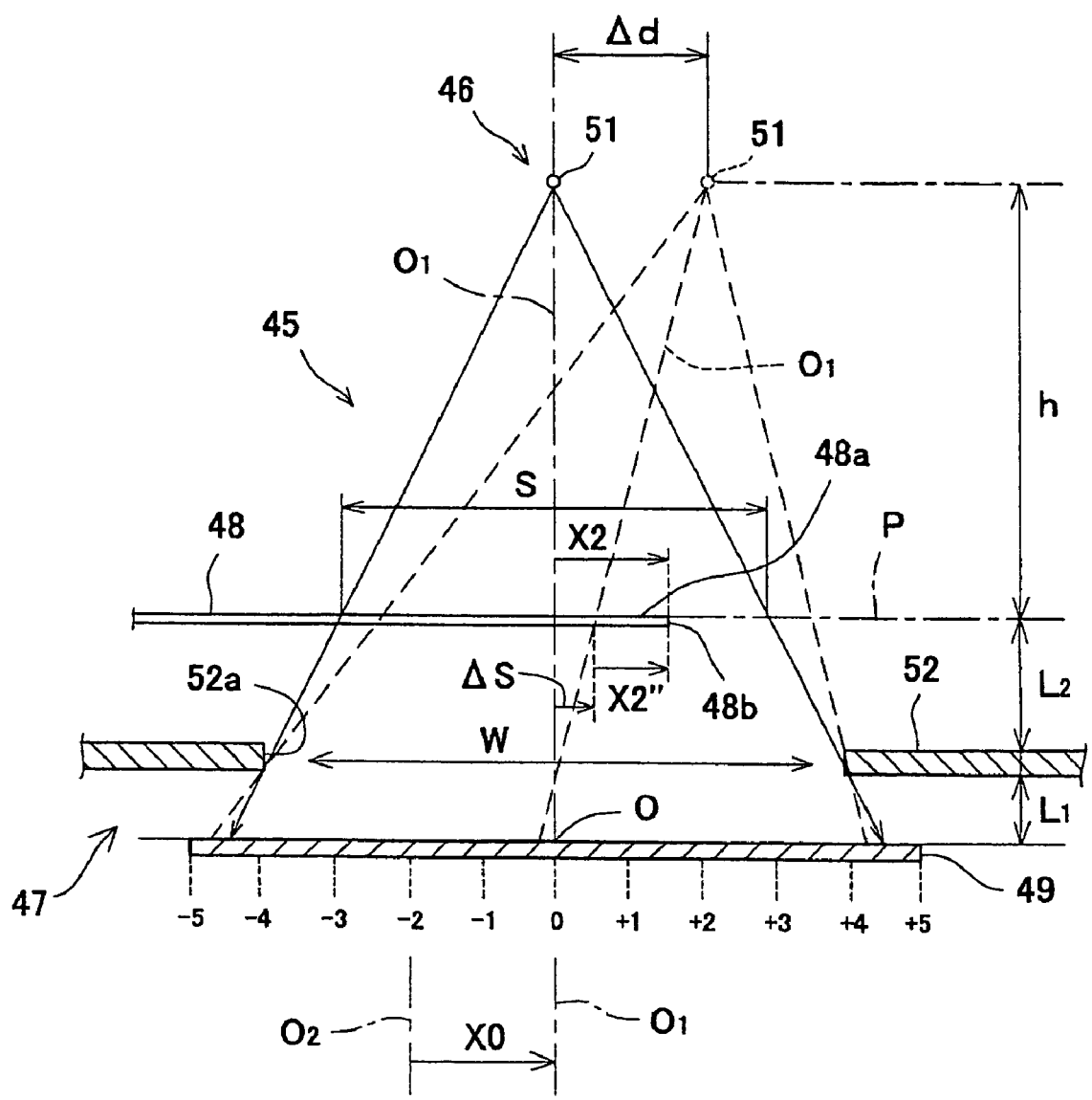
FIG. 4 is a sectional view taken on line A-A of FIG. 3.

According to the above-describe structure, as will be understood from a section of FIG. 4, in the detection area of the lateral deviation detection sensor 45, length S along the direction perpendicular to the transfer direction of the document 48 within the transfer surface P in which the document 48 is transferred is prescribed by the following formula (1).

$$S = hW/(h+L_2) \qquad (1)$$

Wherein, h is the distance between the transfer surface P of the document 48 and the wide directivity LED 51, W is the length of the opening 52a of the diaphragm 52 (length (width) along the direction perpendicular to the transfer direction of the document 48), and $L_2$ is the distance between the transfer surface P of the document 48 and the diaphragm 52. It is noted that in the actual design, the length W of the opening 52a of the diaphragm 52 is decided as W=S (h+L2)/h from the formula (1) on the basis of the necessary length S of the detection area. Further, more preferably, the distance h is made longer in order to narrow the apparent irradiation range.

Further, in case of the present embodiment, the center of the wide directivity LED 51 may be on a vertical line which passes through the center of the photodiode chip 49 and is vertical to the light receiving surface of the photodiode chip 49, and accordingly a center axis of light widened from the wide directivity LED 51 may pass through a center O of the photodiode chip, but a detection reference (reference axis) $O_1$ in the lateral deviation detection sensor 45 is not the center of the photodiode chip 49 and not the optical axis of the wide directivity LED 51 but is set to a center (S/2) of the detection area. More specifically, in the present embodiment, where an end edge 48b of one end portion 48a of the document 48 to be transferred is positioned on the reference axis $O_1$, the deviation amount (lateral deviation amount) of the document 48 in the direction perpendicular to the transfer direction is detected as 0 on the side of the lateral deviation detection sensor 45. On the other hand, unless the end edge 48b of the document 48 is positioned on the reference axis $O_1$, the deviation amount of the document 48 in the direction perpendicular to the transfer direction is detected as positive and negative values, according to the distance between the reference axis $O_1$ and the end edge 48b of the document 48, and the relative position, on the side of the lateral deviation detection sensor 45.

Figure 5:
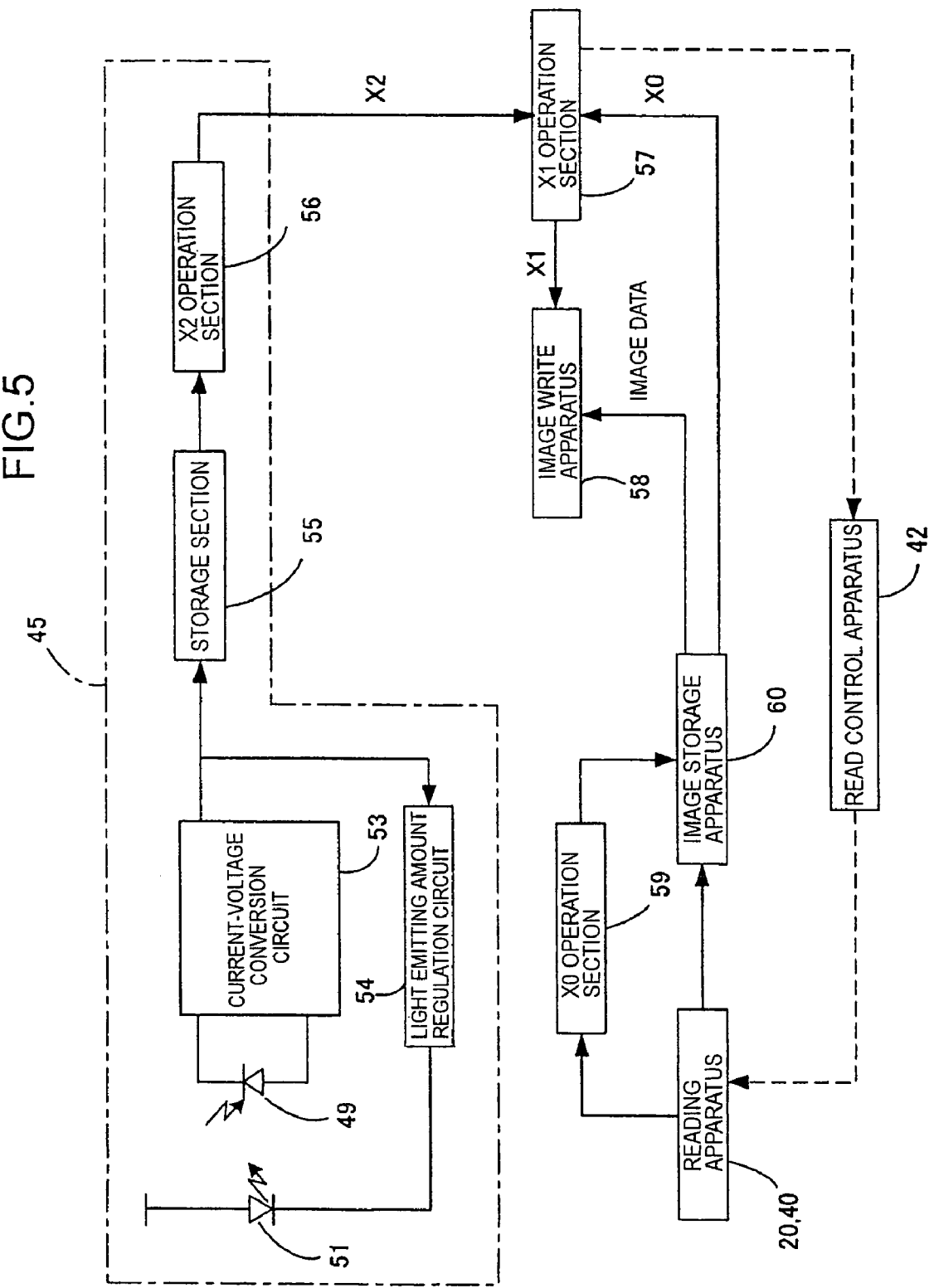
FIG. 5 is a block diagram showing the structure for correcting a read image on the basis of the lateral deviation detection sensor and the light volume detected by the lateral deviation detection sensor.

Further, FIG. 5 is a block diagram showing the structure for correcting a read image on the basis of the lateral deviation detection sensor 45 and the light volume detected by the lateral deviation detection sensor 45. As shown in the figure, the lateral deviation detection sensor 45 comprises, in addition to the light emitting element (wide directivity LED) 51 and the photodiode chip 49, a storage section 55, an X2 operation section 56, and an emitting light volume regulation circuit 54. In this case, the photodiode chip 49 receives light emitted from the wide directivity LED 51 to store a charge corresponding to the light volume (light electromotive force effect), and converts energy of light into electric energy. Therefore, the photodiode chip 49 has a current-voltage conversion circuit 53 having an external load connected between terminals. Further, the emitting light volume regulation circuit 54 regulates the light volume from the wide directivity LED 51 on the basis of an electric signal from the current-voltage conversion circuit 53. Further, the storage section 55 stores a current value $I_0$ (in the present embodiment, a voltage value $V_0$) converted by the current-voltage conversion circuit 53) on the basis of the detection light volume when the document 48 is not present in the detection area, and stores a current value $I_S$ (in the present embodiment, a voltage value $V_S$ converted by the current-voltage conversion circuit 53) on the basis of the detection light volume when the document 48 is present in the detection area, as will be described later. Further, the X2 operation section 56 computes the deviation amount X2 in the direction perpendicular to the transfer direction between the detection reference $O_1$ of the of the lateral deviation detection sensor 45 and the end edge 48b of the document 48 on the basis of current values $I_0$, $I_S$ stored in the storage section 55 (in the present embodiment, voltage values $I_0$, $I_S$ converted by the current-voltage conversion circuit 53), as will be described alter.

Further, other constituent elements shown in FIG. 5, that is, operation sections 57, 59, an image write apparatus 58, and an image storage apparatus 60 are provided, for example, in the image processing board 33. Out of them, the X0 operation section 59 operates the deviation amount X0, described later in advance, between the read reference $O_2$ and the detection reference $O_1$ on the basis of the deviation amount X1' (in the present embodiment, output from the reading apparatus 20, for example) along the direction perpendicular to the transfer direction between the read reference $O_2$ (refer to FIGS. 4 and 6) of the sensor (CCD image sensor 31 or the like) in the reading apparatus 20 (40) and an end edge 90a of an inspection sheet 90 (refer to FIG. 6), and the deviation amount X2' along the direction perpendicular to the transfer direction between the detection reference $O_1$ of the lateral deviation detection sensor 45 and the end edge 90a of the inspection sheet 90, in the initial setting described later.

Further, the image storage apparatus 60 functions as a storage means for temporarily storing image data of the document 48 read by the reading apparatus 20, 40, and stores the deviation amount X0 operated by the X0 operation section 59. Further, the X1 operation section 57 functions as an operation means which computes the deviation amount X1 along the direction perpendicular to the transfer direction between the read reference $O_2$ of the sensor in the reading apparatus 20 (40) and the end edge 48b of the document 48, (calculates the deviation amount with respect to a reference position of the document transfer opposition on the basis of an output signal of the lateral deviation defection sensor 45) on the basis of the deviation amount X0 stored in the image storage section 60 and the deviation amount X2 operated by the X2 operation section 56. It is noted that the X1 operation section 57 may be provided on the lateral deviation detection sensor 45.

Further, the image write apparatus 58 functions as a correction means for correcting image data stored in the image storage apparatus 60 on the basis of the deviation amount X1 operated by the X1 operation section 57, and transmits the corrected image data to an interface board 101. That is, in the present embodiment, it can be said that the image write apparatus 58 constitutes, together with the X1 operation section 57, a control means for correcting and outputting image data stored in the image storage apparatus 60.

In the present embodiment, the read reference $O_2$ of the sensor in the reading apparatus 20 (40) is, specifically, an ideal passage position of the document end, a corresponding relation between positive and negative of the deviation amount X1 resulting from the relative position between the read reference $O_2$ and the end edge 48b of the document 48 coincides with that of the lateral deviation detection sensor 45. That is, in the present embodiment, for example, both the deviation amounts X1, X2 are read as a positive value on the right side of the read reference $O_2$ and the detection reference $O_1$, and both the deviation amounts X1, X2 are read as a negative value on the left side of the read reference $O_2$ and the detection reference $O_1$ (see FIG. 6). Further, in the present embodiment, the deviation amount X0 operated by the X0 operation section 59 may be stored in the storage section 55 of the lateral deviation detection sensor 45.

Next, the method for detecting the lateral deviation amount of the document 48 using the lateral deviation detection sensor 45 will be described.

Where the document 48 is present in the detection area of the lateral deviation detection sensor 45, the light receiving volume of the photodiode chip 49 changes according to the position of the document 48, and therefore if the light receiving volume is converted into the distance, the lateral deviation amount of the document 48 can be detected simply. That is, where the document 48 is not present in the detection area, light emitted from the wide directivity LED 51 toward photodiode chip 49 is incident on the whole light receiving surface of the photodiode chip 49 through the opening 52$a$ of the diaphragm 52, and therefore, an output current of the photodiode chip 49 at that time is indicated by $I_0$ (in the present embodiment, an output voltage converted by the current-voltage conversion circuit 53 is indicated by $V_0$); and where the end edge 48$b$ of the document 48 is present in the detection area, light from the wide directivity LED 51 is partly shielded by the document 48 and incident on the photodiode chip 49, and therefore, an output current of the photodiode chip 49 at that time is indicated by $I_S$ (in the present embodiment, an output voltage converted by the current-voltage conversion circuit 53 is indicated by $V_S$), then where the length of the detection area along the direction perpendicular to the transfer direction of the document 48 is S, the distance d in which the document 48 shielded light can be obtained by the following formula (2).

$$d=S(1-I_S/I_0)=S(1-V_S/V_0) \quad (2)$$

For example, where the light receiving voltage by the photodiode chip 49 when the document 48 is not present in the detection area is 4V, the light receiving voltage by the photodiode chip 49 when the document 48 is present in the detection area is 3V, and the length S of the detection area is 10 mm, the deviation amount X2 of the document with respect to the detection reference $O_2$ of the lateral deviation detection sensor 45 is computed as X2=10 mm×(½−3V/4V)=−2.5 mm.

More specifically, computation of such deviation amount X2 is transferred out in the procedure that the storage section 55 stores the voltage values $V_0$, $V_S$ output from the photodiode chip 49 and the X2 operation section 56 executes operation of the formula (2) on the basis of the voltage values $V_0$, $V_S$ stored in the storage section 55 (is transferred out by calculating the rate in which the light receiving surface of the photodiode chip 49 is covered by the document 48). It is noted that the measurement of the deviation amount X2 is transferred out a few times at timing determined, during the transfer of the document 48, and its average value or the maximum value is employed as the value of X2.

Figure 6:
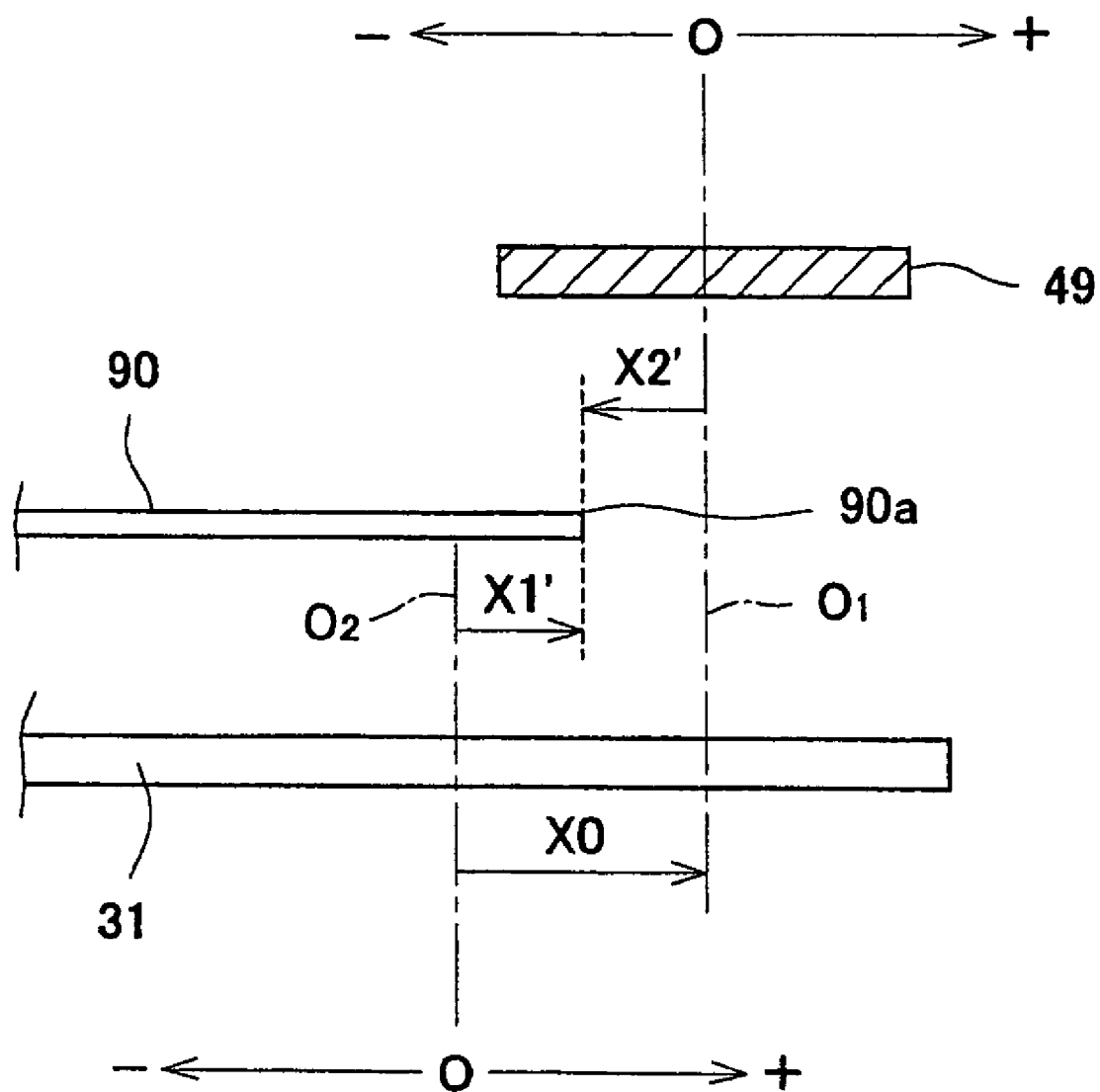
FIG. 6 is a view for explaining the method of initially setting the deviation amount XO as an offset value.

After the document 48 has been transferred actually, and when the deviation amount X2 is measured by the lateral deviation detection sensor 4 in the manner as described above, the X1 operation section 57 computes the deviation amount X1 along the direction perpendicular to the transfer direction between the read reference $O_2$ of the sensor in the reading apparatus 20 (40) and the end edge 48$b$ of the document 48, by the following formula (3).

$$X1=X2+X0 \quad (3)$$

Wherein X0 is a value stored in advance in the image storage apparatus 50, which is the deviation amount between the read reference $O_2$ and the read reference $O_1$. This deviation amount X0 is operated by the X0 operation section 59 at the time of initial setting or at the time of shipment in factory, which the stage before the image read forming is transferred out actually. That is, in this initial setting, first, one inspection sheet 90 is transferred, the deviation amount X1' between the read reference $O_2$ and the end edge 90$a$ of the inspection sheet 90, and the deviation amount X2' between the detection reference $O_1$ and the end edge 90$a$ of the inspection sheet 90 are measured, using the reading apparatus 20 (40) and the lateral deviation detection sensor 45, as shown in FIG. 6. In this case, when the inspection sheet 90 is white, the end edge 90$a$ of the inspection sheet 90 cannot be detected sometimes on the side of the image reading apparatus. Therefore, it is desired that an inspection sheet of black or the like be used. And, the X0 operation section 59 transfers out operation of the following formula (4) on the basis of two measured values X1' and X2' to thereby obtain the deviation amount X0 between the read reference $O_2$ and the detection reference $O_1$ (In an example of FIG. 6, X0, X1' are a positive value, and X2' is a negative value).

$$X0=X1'-X2' \quad (4)$$

It is noted that this deviation amount X0 is stored in the image storage apparatus 60 as an offset value, as mentioned previously.

When the X1 operation section 57 computes the deviation amount X1 between the read reference $O_2$ and the end edge 48$b$ of the document 48 on the basis of the deviation amounts X0, X2, in the manner as described above, the image write apparatus 58 writes an image by displacing a position by X1 from the reference position. That is, the image write apparatus 58 corrects mage data stored in the image storage apparatus 60 on the basis of the deviation amount X1 operated by the X1 operation section 57 (adjusts an image write position or the like), and transmits the corrected image data to an interface board 101. Thereby an output image whose deviation amount is corrected is obtained.

It is noted that while in the above-described embodiment, the deviation amount X1 between the read reference $O_2$ and the end edge 48$b$ of the document 48 is computed, and the image data is corrected on the basis of the deviation amount X1, the read area for the reading apparatuses 20,40 may be corrected (adjusted) on the basis of the deviation amount X1 operated by the X1 operation section 57. That is, as shown by the dotted line in FIG. 9, a document read start opposition in a scanning direction perpendicular to the document transfer direction by the reading apparatuses 20, 40 is corrected on the basis of the deviation amount X1 operated by the X1 operation section 57 by the read control apparatus 42, and the reading apparatuses 20, 40 are controlled so as to read an area as provided from the corrected read start position.

As described above, the image reading apparatus 1 in the present embodiment comprises the lateral deviation detection sensor 45 as a first detection means arranged at one end position in the direction perpendicular to the transfer direction of the document 48 to detect the light volume according to the deviation amount at a document transfer position in the direction perpendicular to the transfer direction of the end edge 48$b$ of the document 48, the image storage apparatus 60 as a storage means for temporarily storing image data of the document 48 read by the reading apparatuses 20, 40, the operation section 56 as an operation means for calculating the deviation amount with respect to a reference position of the document transfer position on the basis of an output signal of the lateral deviation detection sensor 45, and the image write apparatus 56 as a correction means for correcting image data stored in the image storage apparatus 60 according to the deviation amount calculated by the operation sections 56, 57.

As described, the lateral deviation position of the document 48 is not detected by ON/OFF every pixel, but if the light volume according to the deviation amount at the transfer position of the document 48 is detected, a light receiving element having many pixels need not be used. That is, in the present embodiment, on the basis of an idea that the light volume according to the deviation amount at the transfer position of the document 48 is detected, only one photodiode chip 49 is use, and a light receiving element having a plurality of pixels such as CCD. A photodiode array or the like is not used. Therefore, the price is low, and the signal processing circuit is extremely simple. Further, in the present embodiment, a single light emitting element (wide directivity LED or the like) whose directivity is wide such that the whole surface of the photodiode chip 49 can be irradiated with the same luminescence is used, and no lens or a diffusion plate for forming parallel light is used, and therefore a large space is not necessary and the price is low. If a detection area is about 10 mm, one photodiode and one LED having wide directivity as in the present embodiment will suffice, and if a detection area is wider than the former, a pair of light receiving and emitting elements may be increased according to the size of the document.

Further, in the present embodiment, the diaphragm 52 is provided whereby even if a position of the wide directivity LED 51 is deviated in the lateral direction, the length S of the detection area is always kept constant. That is, as shown in FIG. 4, where the position of the wide directivity LED 51 is deviated by Δd from a position indicated by the solid line to a position indicated by the broken line, the detection area is shifted to the right, but since the length W of the diaphragm 52 is constant, the length S of the detection area is always constant. The detection reference (reference position) $O_1$ of the lateral detection sensor 45 of the present invention is not the center of the photodiode chip 49 nor the center of the wide directivity LED 51, but is set to the center of the detection area, and therefore it is always S/2 (constant), and the deviation amount X2 is also $X2=S\ (\frac{1}{2}-I_S/I_0)$ from the formula (2), which is nothing to do with the deviation between the wide directivity LED 51 and the photodiode chip 49. Where the detection area s shifted due to the deviation or the like between the wide directivity LED 51 and the photodiode chip 49, the offset value of the deviation amount may be merely set again (the shift portion of the detection area is included in X0) (In an example of FIG. 4, XO shifts to the right merely by ΔS, and accordingly, the deviation amount X2 at the solid line position is detected as X2".

Further, in the present embodiment, since the offset amount X0 is to be stored by the initial setting, where the detection reference O1 is not adjusted to the read reference O1, it is not necessary to mechanically adjust these references.

Here, in the present embodiment, there is employed a center reference transfer system for adjusting the center in the width direction in the documents of all sizes to the center on the feed tray to transfer the documents. In this center reference transfer system, for detecting the transfer position deviation amount of the documents of various sizes, the lateral deviation detection sensor may be mounted at the individual positions according to the sizes of the documents (a plurality of them may be arranged according to the kinds of the lateral width sizes of the documents to be read), and the mounting position may be changed according to the document sizes used frequently or the sizes for which lateral deviation correction is not particularly carried out to deal therewith. Further, the lateral deviation detection sensor is installed movably manually or automatically according to the lateral width sizes of the documents to be read at the one side end position to deal therewith also.

The specific mounting construction of the lateral deviation detection sensor corresponding to the kinds of the lateral width sizes of the documents to be read as described above will be described hereinafter. A description will be made hereinafter of the case where with respect to the documents of two kinds of sizes, the lateral deviation is detected.

Embodiment 1

Figure 10:
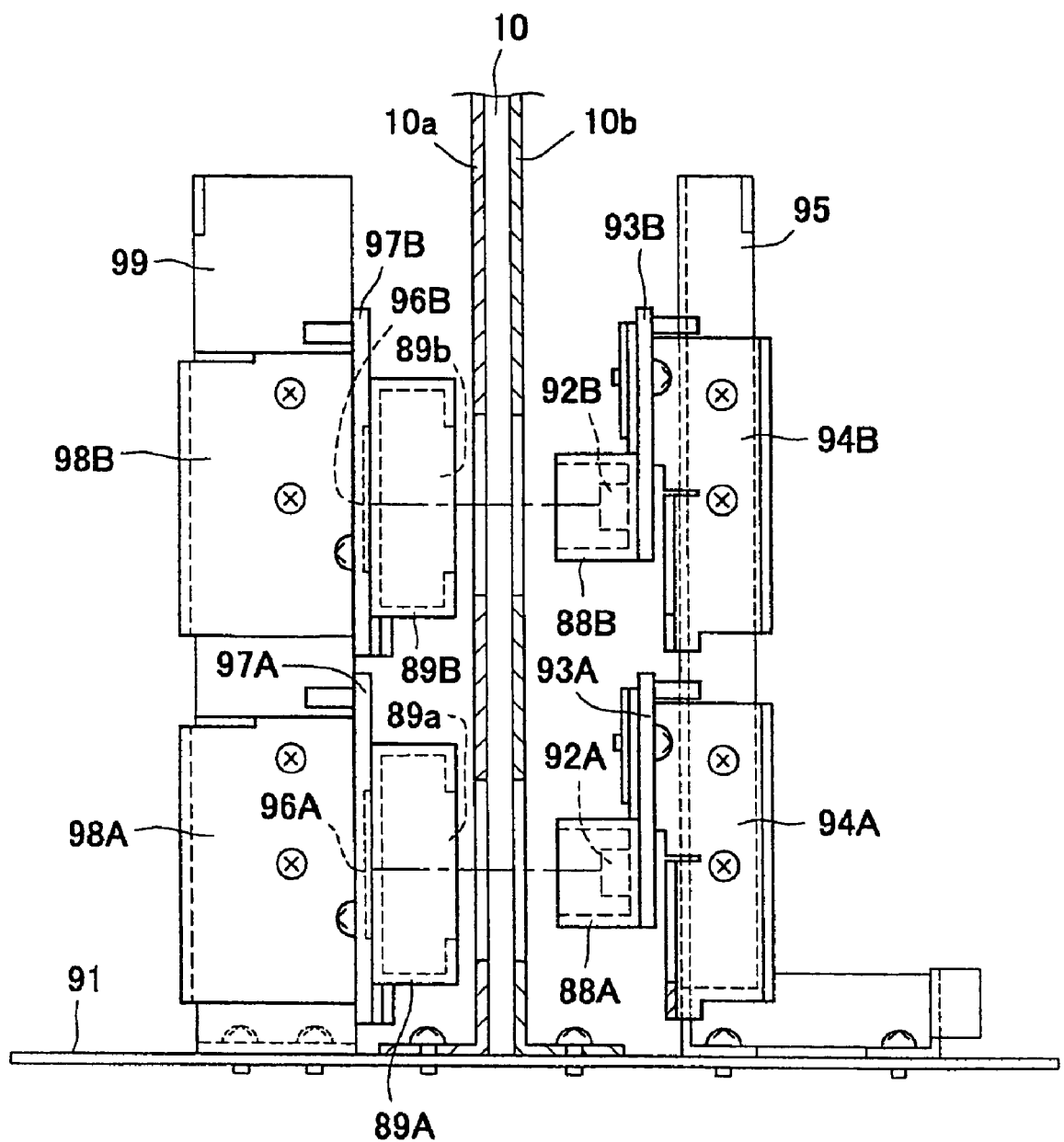
FIG. 10 is a plan view of the construction in which a plurality of lateral deviation detection sensors are arranged at positions corresponding to the kinds of lateral width sizes of a document.

First, the structure for mounting a plurality of lateral deviation detection sensors 45 on positions corresponding to the sizes of the documents (Embodiment 1) will be described with reference to a plan view of FIG. 10 showing the construction in which a plurality of lateral deviation detection sensors are arranged at positions corresponding to the kinds of lateral width sizes of the documents.

In the light emitting portion internally of a transfer channel 10, a board for LED 93A having a wide directivity LED 92A mounted thereon is mounted on a bracket for LED 94A, and an LED board 93B having a wide directivity LED 92B mounted thereon is mounted on a bracket for LED 94B. The brackets 94B, 94A are mounted by fixing screws at positions corresponding to the document sizes of a support member for LED 95 mounted on an apparatus side plate 91, respectively.

Further, in the light receiving portion externally of the transfer channel 10, a photodiode board 97A (hereinafter referred to as a board for PD) having a photodiode chip 96A mounted thereon is mounted on a bracket for photodiode (hereinafter referred to as a bracket for PD) a PD board 97B having a photodiode chip 96B mounted thereon is mounted on a bracket for PD 98B. And, the brackets 98A, 98B are mounted at positions corresponding to the document sizes of a support member for photodiode (hereinafter referred to as a support member for PD) 99 mounted on the apparatus side plate 91, respectively.

By the structure as described, one lateral deviation detection sensor composed of the wide directivity LED 92A and the photodiode chip 96A is arranged at a position corresponding to the document of the size which is long in the wide direction, and the other lateral deviation detection sensor composed of the wide directivity LED 92B and the photodiode chip 96B is arranged at a position corresponding to the document of the size which is short in the wide direction. And, either one lateral deviation detection sensor or the other lateral deviation detection sensor is selected according to size information of the document to actuate it, and the light volume according to the lateral deviation of the document is detected. Thereafter the lateral deviation amount is operated on the basis of the light volume.

Reference numerals 88A, 88B denote shield members provided on the wide directivity LEDs 92A, 92B, respectively, to limit the irradiation range of the wide directivity LEDs 92A, 92B, and prevent disturbance light. Further, a diaphragm member 89A having an opening 89a set to the size that the whole surface of the photodiode is irradiated as mentioned previously is provided between the wide directivity LED 92A and the photodiode chip 96A, and a diaphragm member 89B having an opening 89b is provided between the wide directivity LED 92B and the photodiode chip 96B, so that irradiation light of one wide directivity LED 92A or the other wide directivity LED 92B passes through openings of an outer guide 10a and an inner guide 10b forming the transfer channel 10, and is limited to the prescribed defection range by one diaphragm member 89A or the other diaphragm member 89B to be emitted to one photodiode chip 96A or the other photodiode chip 96B.

Next, with respect to the specific structure of a means for moving the lateral deviation detection sensor 45, the means for moving it include the structure which is provided with an operating element to move it manually (Embodiment 2), the structure for moving it automatically by an actuator such as a solenoid or a motor (Embodiment 3), and the structure for removing it once and changing a position to mount it (Embodiment 4). Their structures will be described hereinafter.

Embodiment 2

Figure 11:
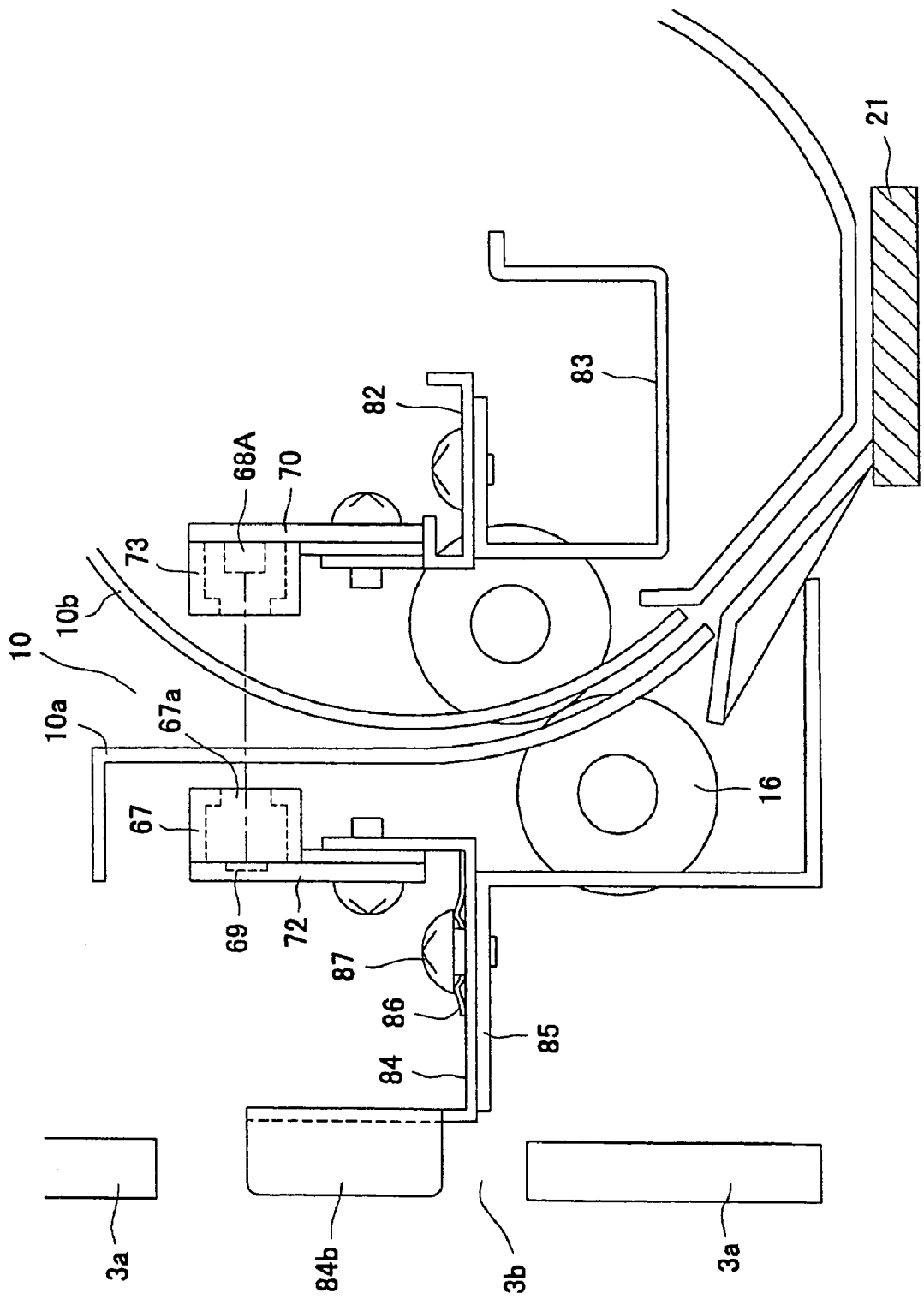
FIG. 11 is a sectional view showing the construction in which a light receiving element of the lateral deviation detection sensor is moved manually.

One example of the embodiment having the structure which is provided with an operating element to move manually will be described with reference to a sectional view of FIG. 11 showing the mounting construction of the lateral deviation detection sensor 45, and plan views of FIGS. 12(*a*) and (*b*) the mounting construction of the lateral deviation detection sensor 45. Here, the lateral deviation amount of the document is detected by wide directivity LED (light emitting diode) 68A, 68B as two light emitting elements arranged at positions corresponding to two kinds of the document sizes frequently used, and a single photodiode chip 69 which is movable to positions corresponding to two wide directivity LED 68A, 68B, respectively.

Two wide directivity LED 68A, 68B arranged in the light emitting portion internally of the transfer channel 10 are mounted on an LED board 70 and mounted on a bracket for LED 82. And, the bracket for LED 82 is secured by a fixing member such as a screw to a support member for LED 83 mounted on an apparatus side plate 80 and mounted. Reference numeral 73 denotes a shield member for limiting the irradiation range and preventing disturbance light surrounding all sides of the wide directivity LED 68A, 68B, and the shield member 73 is also integral with the LED board 70 and mounted on the bracket for LED 82.

On the other hand, the photodiode chip 69 as a light receiving element is arranged in the light receiving portion provided opposite to the light emitting portion with the transfer channel 10 interposed. This photodiode chip 69 is mounted on the PD board 72. And, the PD board 72 and a diaphragm member 67 having an opening 67*a* are mounted on a bracket for PD 84 by means of a fixing member such as a screw. This bracket for PD 84 is mounted slidably in width direction of the sheet on a support member for PD 85 secured to a side plate 80 of the apparatus.

The structure of the sliding movement will be described hereinafter with reference to FIGS. 12(*a*) and (*b*). The bracket for PD 84 is provided with a slot 84*a*, and mounted on the support member for PD 85 by a stepped screw 87 through the slot 84*a*. As described, the bracket for PD 84 is mounted by the slot 84*a* and the stepped screw 87 in the loosen state with respect to the support member for PD 85, and the bracket for PD 84 is constituted movably along the slot 87. Further, the bracket for PD 84 is provided with an operating element 84*a* exposed to the outside from an opening 3*b* of an apparatus cover 3*a*. The operating element 84 is suitably operated by an user to move the bracket for PD 84, and the photodiode chip 69 is moved to a position corresponding to one wide directivity LED 68A (see FIG. 12(*a*)) and to a position corresponding to the other wide directivity LED 68B (see FIG. 12(*b*)). Further, the opening 3*b* is provided with a lid not shown, which can be exposed only when the photodiode chip 69 is moved.

In the figure, reference numeral 86 denotes a plate spring as a biasing means for biasing the bracket for PD 84 to the support member for PD 85. By the plate spring 86, a play of the bracket for PD 84 is suppressed and a sliding load between it and the support member for PD 85 is increased so that the bracket for PD 84 is not deviated simply from a moving position.

By the structure as described, a control is made so that for example, where the document of the size which is short in the width direction is transferred, as shown in FIG. 12(*a*), an operating portion 84*b* of the bracket for PD 84 is operated manually to the central side (in the figure, upper side) in the width direction of the transfer channel 10, the photodiode chip 69 is moved to a position corresponding to one wide directivity LED 68A, and only one wide directivity LED 68A is caused to emit. Thereby, the lateral deviation amount of the document of short size is detected. Further, where the document of the size which is long in the width direction is transferred, as shown in FIG. 12(*a*), an operating portion 84*b* of the bracket for PD 84 is operated manually to an end side (in the figure, lower side) in the width direction of the transfer channel 10, the photodiode chip 69 is moved to a position corresponding to the other wide directivity LED 68, only the other wide directivity LED 68B is controlled to emit, and the lateral deviation amount of the document which of long size.

By the structure as described, the detection value of the deviation amount can be obtained with high accuracy with respect to the documents of plural sizes without complicating the structure or the detection processing.

It is noted that the outer guide 10*a* and the inner guide 10*b* constituting the transfer channel 10 are respectively provided with an openings 10*c* and 10*d* so that irradiation light of the wide directivity LEDs 68A, 68B passes through toward the photodiode chip 69, and the irradiation light having passed through the openings 10*c*, 10*d* is limited by irradiation light corresponding to the prescribed detection area by the diaphragm member 67 to be received by the photodiode chip 69.

In the apparatus of the present embodiment, since the transfer channel 10 is formed to be U-shaped, a wide directivity LED as a light emitting element arranged internally of the U-shaped transfer channel 10 is not easily moved manually. Therefore, there is constituted so that two wide directivity LEDs 68A, 68B are provided, and only the photodiode chip 69 is moved. However, alternatively, there may be, of course, constituted so that the wide directivity LED and the photodiode chip are provided one by one, and the wide directivity LED and the photodiode chip are moved according to the lateral width size of the documents to be read.

As the structure for moving the wide directivity LED and the photodiode chip, for example, as shown in 13, a wide directivity LED 120 is mounted on an LED board 121, and a slot 122*a* is formed in a bracket for LED 122 supporting the LED board 121. A stepped screw 123 is inserted into the slot 122*a*, and the bracket for LED 122 is screwed to a support member for LED 124. Thereby, the bracket for LED 122 can be moved along the slot 122*a*. Further, a plate spring 125 for biasing the bracket for LED 122 to the support member for LED 124 is provided between the bracket for LED 122 and the stepped screw 123, and by the operation of the plate spring 125, a play of the bracket for LED 122 is suppressed, the movement of the bracket for LED 122 is transferred out smoothly, holding it at a moving position. Further, the bracket for LED 122 is provided with an operating element 122*b* for moving LED, and a user operates the operating element for LED 122*b* whereby the bracket for LED 122 moves to a position corresponding to an end position in the width direction of the sheet of each size.

And, if the mounting construction of the photodiode on the of the light receiving portion is the structure similar to that shown in FIG. 12, the wide directivity LED 120 and the photodiode chip 69 can be moved respectively to a position corresponding to the document of the size which is short in the width direction (see FIG. 13(*a*)) and a position corresponding to the document of the size which is long in the width direction (see FIG. 13(*b*)). In FIG. 13, the light receiving portion side has the same structure as that of the aforementioned embodiment, and the same reference numerals are used to show it.

In the apparatus having the U-shaped transfer channel 10 as shown in FIG. 1, preferably, parts of the outer guide 10*a* and the inner guide 10*b* of the transfer channel 10 are opened and the inside of the inner guide 10*b* is exposed.

Further, while in the foregoing, the wide directivity LED and the photodiode chip are individually moved, if the structure in which the brackets 84, 122 are connected to be moved together or the structure in which the wide directivity LED 120 and the photodiode chip 69 are interlocked to be moved is employed, the wide directivity LED 120 and the photodiode chip 69 are moved by one-time operation, thus further facilitating handling thereof.

Embodiment 3

Figure 14:
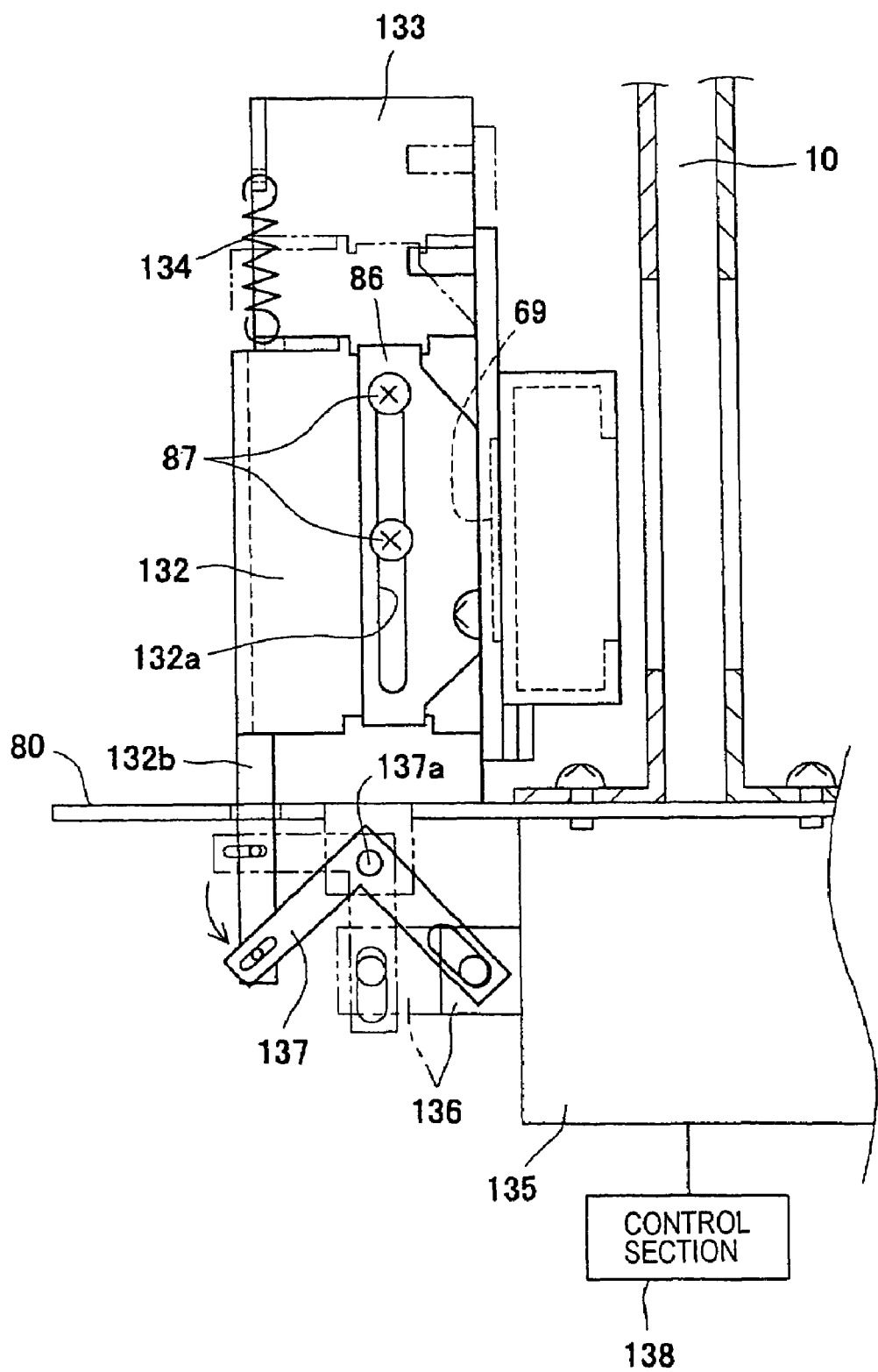
FIG. 14 is a plan view showing main parts of the construction in which a light emitting element of the lateral deviation detection sensor is moved automatically.

Next, one example of the embodiment in the structure for automatic movement will be described with reference to a plan view of FIG. 14 showing main parts of the construction for automatically moving a light receiving element of the lateral deviation detection sensor. In this structure, a pulling string 134 is provided between a support member for LED 133 and a bracket for LED 132, and a plunger 136 of a solenoid 135 mounted on a side plate 80 and a projecting portion 132*b* of the bracket for LED 132 are connected by an arm member 137.

And, when a solenoid 35 is turned ON (energized) by a control means 138, the plunger 136 is attracted. Thereby, the arm member 137 is turned about a turning pin 137*a*, and the bracket for LED 132 is moved to a position (position indicated by the solid line of FIG. 14) corresponding to the document of the size which is long in sheet width on the end side (in the figure, lower side) in the width direction of the transfer channel 10 against the pulling force of the pulling spring 134. On the other hand, when the solenoid 35 is turned OFF (unenergized) by the control means 138, the plunger 136 is placed in a free state, and the bracket for LED 132 is moved to a position (position indicated by the two-dot chain line of FIG. 14) corresponding to the document of the size which is short in sheet width on the central side (in the figure, upper side) in the width direction of the transfer channel 10 by the pulling force of the pulling spring 134.

It is noted that while only the light receiving portion side has been described above, if the structure is employed in which similarly to the light receiving portion side, also on the light emitting side, a pulling string is provided between a support member for LED and a bracket for LED, and a plunger of a solenoid mounted on a side plate and the other end side of the bracket for LED are connected, the wide directivity LED on the light emitting side can be also moved automatically. Further, in the structure in which the brackets for PD and LED are connected integrally, if a solenoid and a pulling spring are provided on either the light emitting side or the light receiving side is provided, the wide directivity LED on the light emitting portion side and the photodiode chip n the light receiving portion side can be moved automatically.

Further, for the structure in which at least one of the brackets on the light receiving portion side and the light emitting portion side is moved by a motor, rack and pinion used in general may be used. Briefly explaining, the structure may be employed in which at least, one of the bracket for LED and the bracket for PD is mounted on the rack, the pinion is rotated by a motor to thereby move the rack, and at least one of the wide directivity LED and the photodiode chip is moved to a position corresponding to the document size.

Embodiment 4

Figure 15:
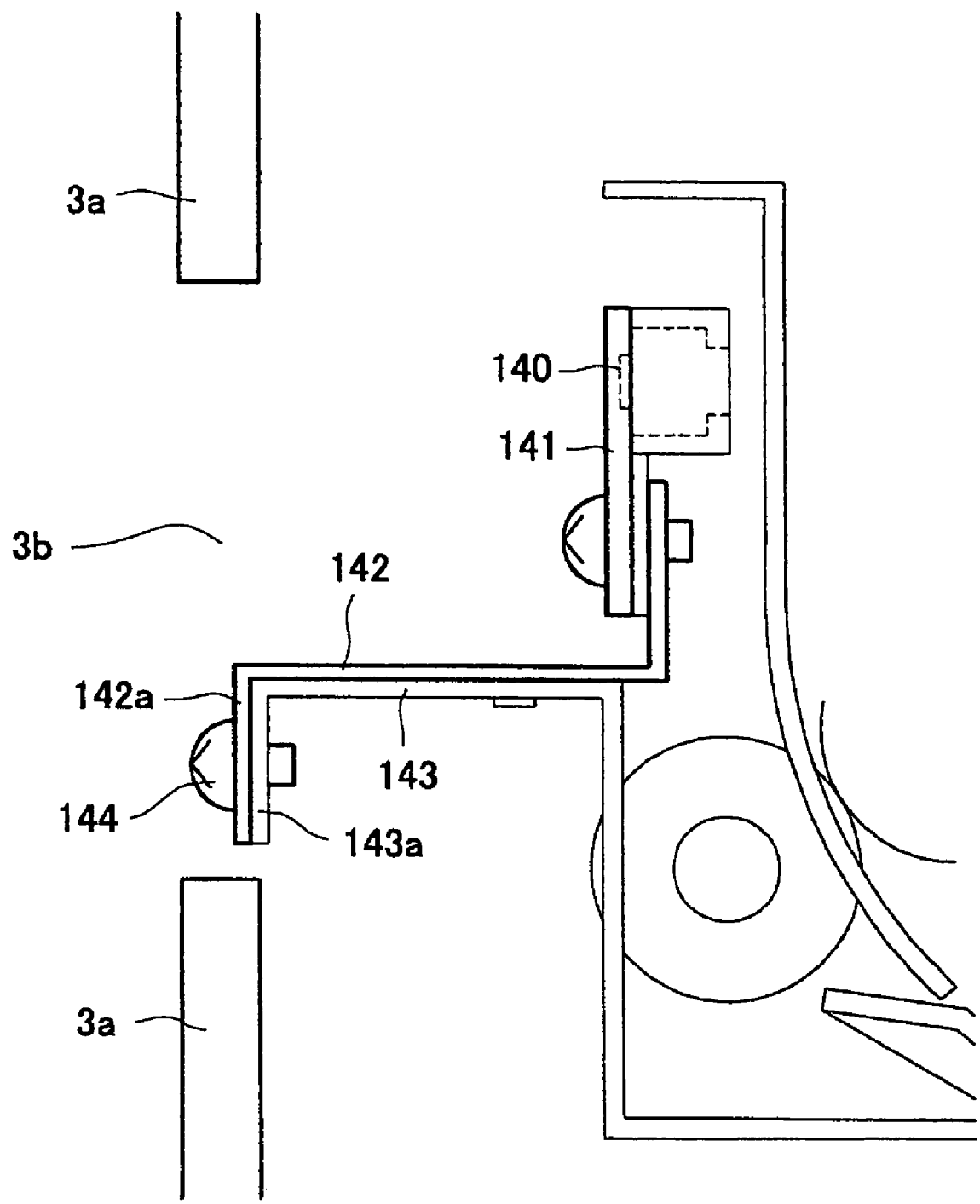
FIG. 15 is a sectional view showing the construction in which a mounting position of a light receiving element of the lateral deviation detection sensor is changed.

Next, the structure in which a bracket supporting a light receiving element is removed once and mounted after changing a position to move the light receiving element will be described with reference to a sectional view of FIG. 15 showing the construction for changing a mounting position of a light receiving element of the lateral deviation detection sensor, and FIG. 16 showing the state that a light receiving element is mounted in the construction for changing a mounting position of a light receiving element of the lateral deviation detection senor.

As shown in FIG. 15, there comprises a PD board 141 on which a photodiode chip 140 as a light receiving element is mounted, a bracket 142 on which the PD board 141 is mounted, and a support member 143 mounted on an apparatus side plate (not shown) to support the bracket 142. Further, as shown in FIG. 16, a first and second threaded holes 143*b*, 143*c*, a first, second and third projections 143*d*, 143*e*, 143*f* are provided on a mounting portion 143*a* of the support member 143 on which the bracket 142 is mounted, and a threaded hole 142*d* and a round hole 142*b* and a slot 142*c* are provided in a mounting portion 142*a* of the bracket 142. And, the bracket 142 is fitted in two projection adjacent to each other out of three projections 143*d*, 143*e*, 143*f* to perform positioning, and at the positioned position, the threaded hole 142*d* of the bracket 142 and a threaded hole (either the threaded hole 143*b* or 143*c*) of the support member 134 corresponding to the threaded hole 142*b* are extended through by a screw 144 and screwed.

In the structure as described, where the lateral deviation amount of the document of the size which is long in the width direction is detected, as shown in FIG. 16(*a*), the round hole 142*b* of the bracket 142 is fitted in the second projection 143*e* of the support member 143, and the slot 142*c* of the bracket 142 is fitted in the first projection 143*d* of the support member 143 whereby the photodiode chip 140 is positioned to a position corresponding to the document of the size which is long in the width direction, and the threaded hole 142*d* of the bracket 142 and the first threaded hole 143*b* of the support member 134 are extended through by the screw 144 and fixed by screwing. Where the photodiode chip 140 is moved from a position for detecting the lateral deviation amount of the document of the size which is long in the width direction to a position for detecting the lateral deviation amount of the document of the size which is short in the width direction, the bracket 142 is removed once from the support member 143, and as shown in FIG. 16(*b*), the round hole 142*b* of the bracket 142 is fitted in the third projection 143*f* of the support member 143, and the slot 142*c* of the bracket 142 is fitted in the second projection 143*e* of the support member 143 whereby the photodiode chip 140 is positioned to a position corresponding to the document of the size which is short in the width direction, and the threaded hole 142*d* of the bracket 142 and the first threaded hole 143*c* of the support member 134 are extended through by the screw 144 and fixed by screwing.

It is noted that the outer cover 3a is formed with an opening 3b for exposing at least the mounting portion 143a of the support member 143 and the mounting portion 142a of the bracket 142, and the bracket 142 can be detachably moved with respect to the support member 143 from the outside easily. Further, the opening 3b is provided with a lid not shown, which can be exposed only when the photodiode chip 140 is moved.

Here, in the bracket 142 to be mounted on the support member 143, the round hole 142b of the bracket 142 is fitted in the projection of the support member 143 to thereby provide positioning in the width direction of the document, and the slot 143c and the round hole 142b are respectively fitted in different projections of the support member 143 whereby a prescribed inclination is provided. That is, a plurality of fitting holes provided in the bracket are fitted in a plurality of projections provided on the support member to mount the bracket whereby the position and inclination of the photodiode chip are controlled and held.

Figure 18:
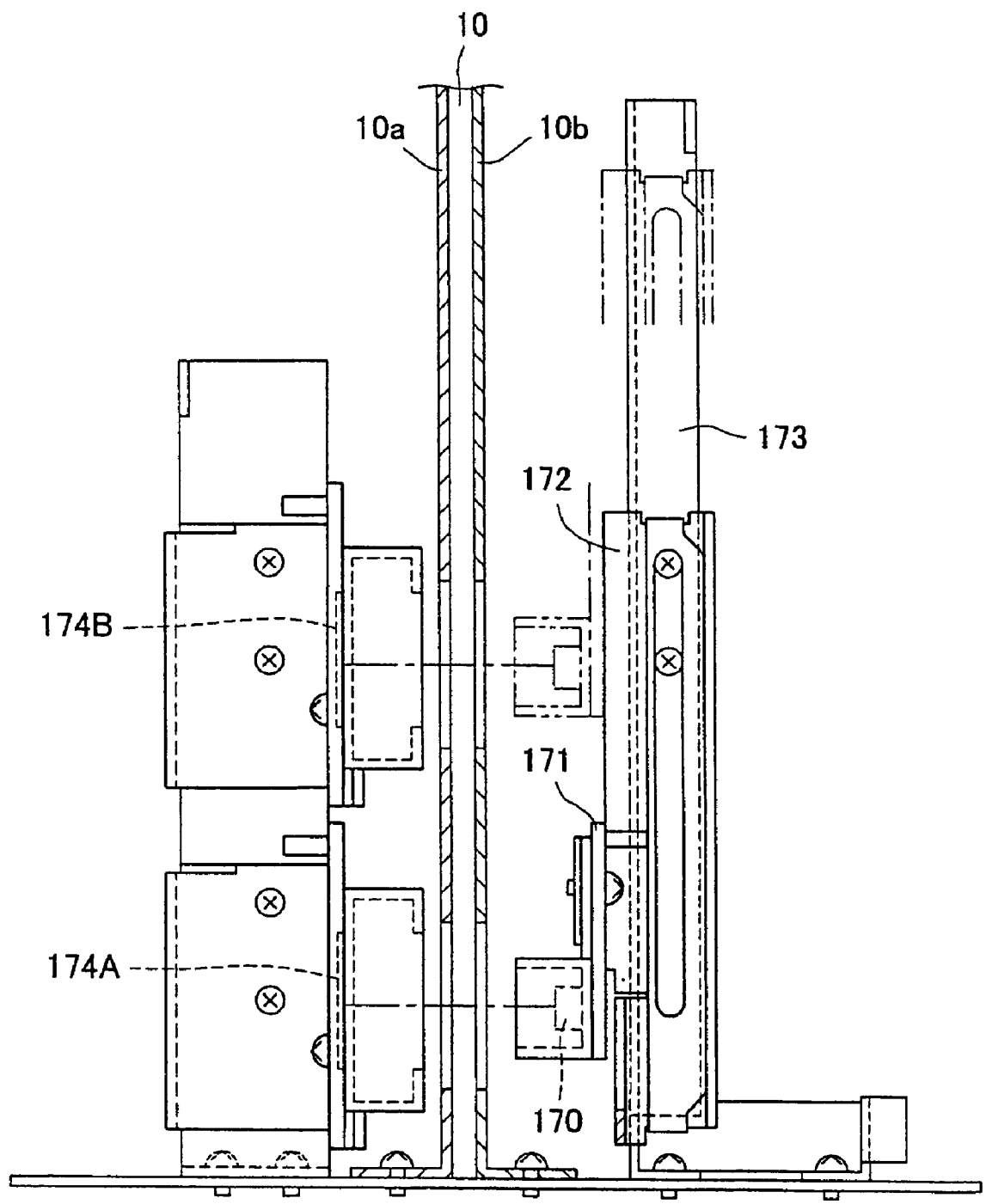
FIG. 18 is a plan view showing one example of the construction in which a light emitting element of the lateral deviation detection sensor is moved.

In the aforementioned embodiments 2 to 4, a description has been made of the structure in which the photodiode chip as a light receiving element, or the wide directivity LED as a photodiode chip and a light emitting element is moved. However, the structure may be employed in which as shown in FIG. 18, a wide directivity LED 170 is moved to positions corresponding to a plurality of photodiode chips 174A, 174B secured to positions corresponding to the different sizes in the width direction of the document. The structure for moving the wide directivity LED 170 in this case can be easily accomplished by movably mounting a bracket 172 on which a mounted board 171 of the wide directivity LED 170 on a support member 173 using a stepped screw, similar to the aforementioned embodiment 2.

Incidentally, where the photodiode is used as a sensor for detecting the lateral deviation amount of the document 48 as in the present embodiment, if the document rarely permeates the light irradiated from the light emitting element, there poses no problem. However, since the thin document or the like permeates light, it cannot be sometimes regarded as a complete shield. Therefore, light that permeates the document and reaches the photodiode brings forth an error of a document position, thus possibly worsening the detection accuracy of the lateral deviation of the thin sheet.

In view of the foregoing, a description will be hereinafter made of a method in which a sensor for measuring the light permeation amount of the document is provided, and a detection value by the lateral deviation detection sensor 45 is corrected on the basis of the detection value by the sensor to thereby eliminate the influence on the lateral deviation detection value of the document caused by the light permeating the document. It is noted that in the following, the same constituent parts as those of the aforementioned embodiment are indicated by the same reference numerals, detailed description of which is omitted.

Figure 7:
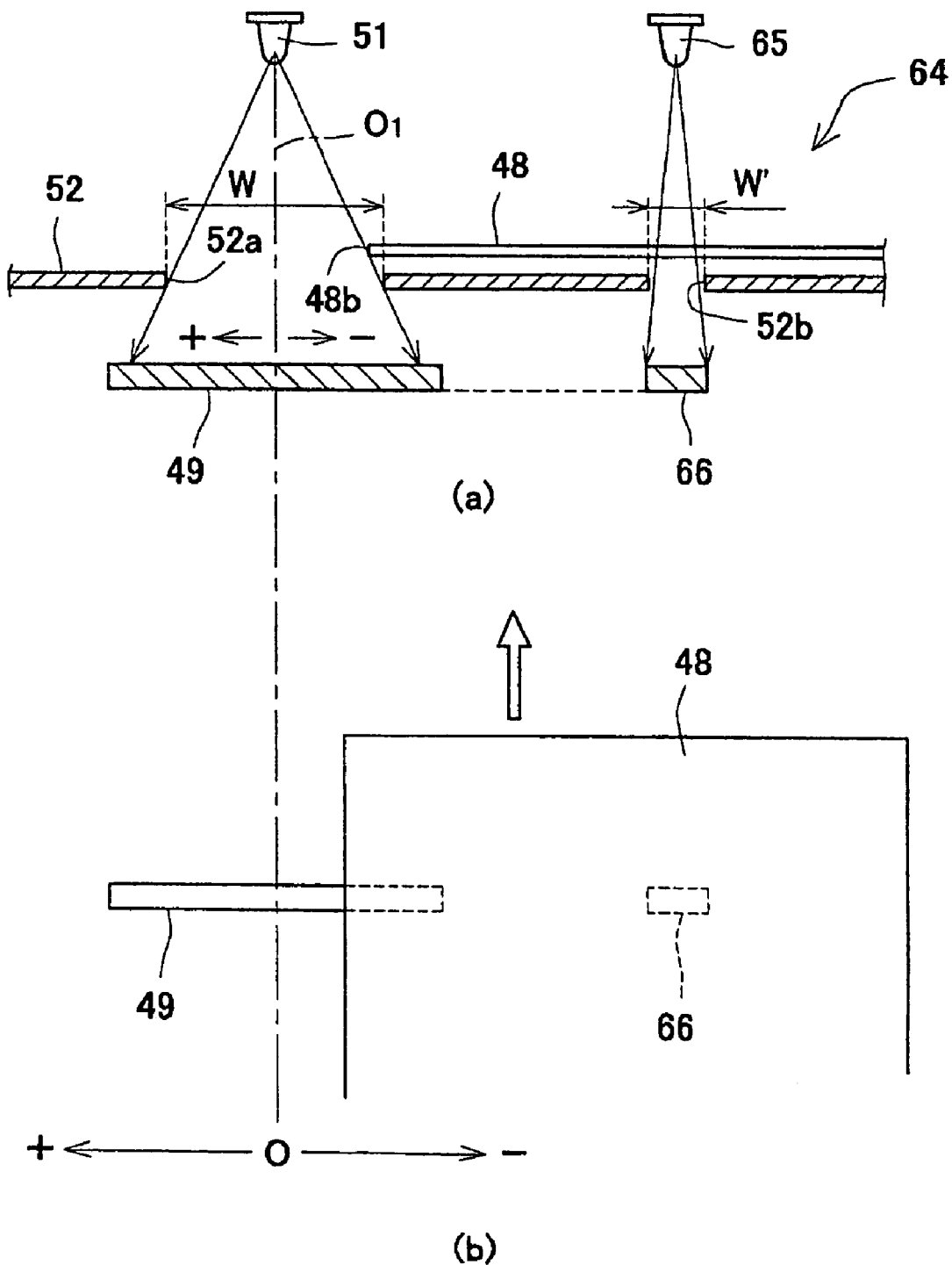
FIG. 7 is a sectional view corresponding to FIG. 4 the lateral deviation detection structure in consideration of the permeation volume of light by a document.

In FIG. 7, reference numeral 66 denotes a light receiving element of the light permeation amount detection sensor 64 as a second light detection means for measuring the light permeation amount of the document 48, kind or shape of which does not care as long as an output current proportional to the light receiving amount is obtained. Further, reference numeral 65 denotes a light emitting element as a light source for the light receiving element 66, kind or shape of which does not care as long as the whole surface of a separate opening 52b (length W) provided in the diaphragm 52 can be irradiated. It is noted that the light receiving element 66 and the light emitting element 65 are arranged at a position completely shielded by the document 48 when the document 48 is transferred, because of sensors for measuring the permeation amount of the document 48. Further, the light receiving element 66 is arranged at approximately the same position as the photodiode chip 49 in the transfer direction.

Figure 9:
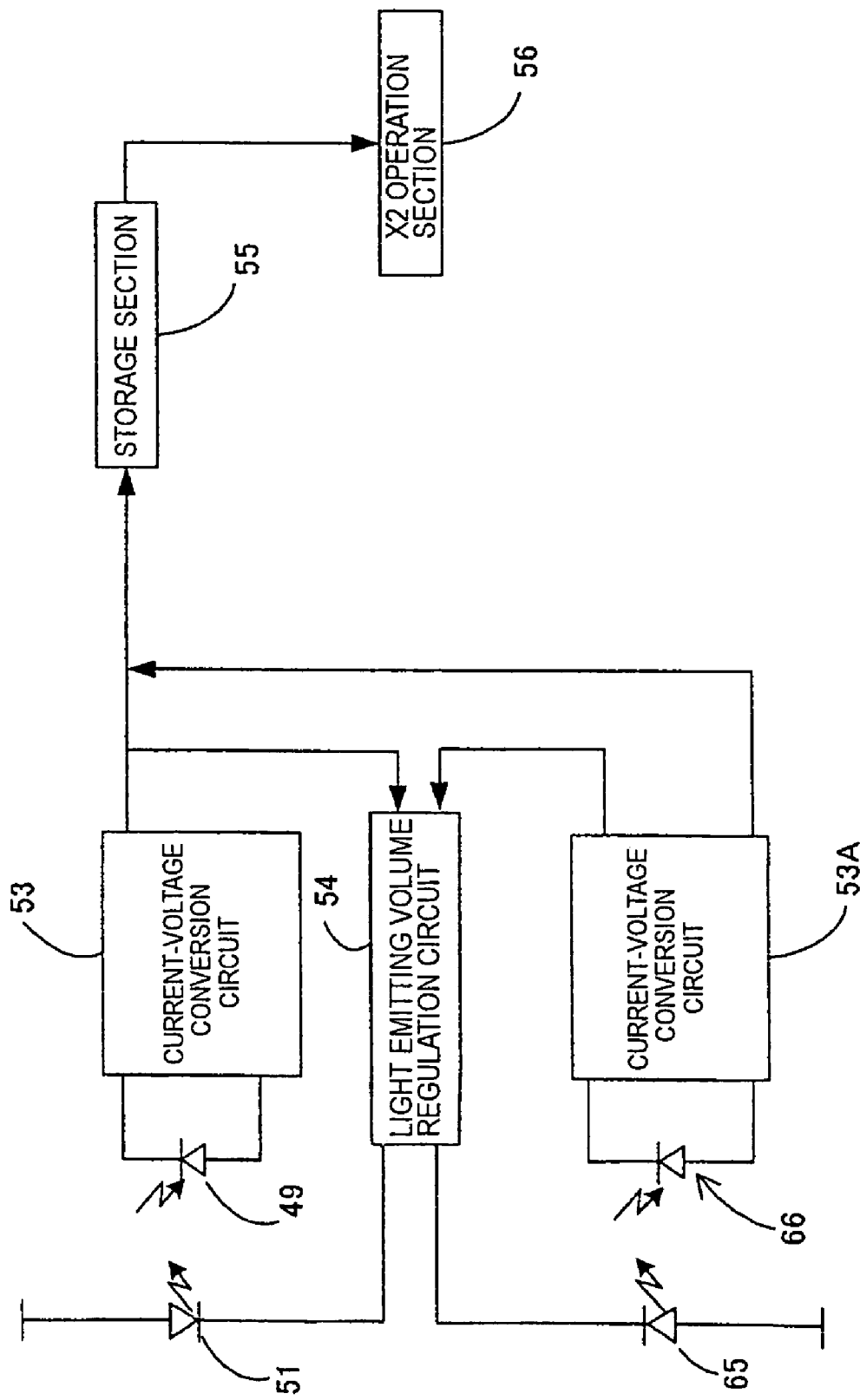
FIG. 9 is a block diagram showing the lateral deviation detection structure in consideration of the permeation volume of light by a document.

The opening 52b of the diaphragm 52 is to adjust the light receiving amount of the light receiving element 66. The width W' of the opening 52b of the diaphragm 52 and the light receiving circuit sensitivity are set by experiments so that the ratio between an output current by the light receiving element 66 when the document 48 is not present in the detection area of the light receiving element 66 and an output current by the light receiving element 66 when the document is present in the whole surface of the detection area of the light receiving element 66 is the same as that of the photodiode chip 49. As shown in FIG. 9, the light receiving circuit of the light receiving element 66 is a current-voltage conversion circuit 53A for converting an output current into a voltage similarly to that of the photodiode chip 49.

In the structure as described, first, the sensitivity or the light emitting amount is adjusted so that in the state that the document 48 is not present, the output voltage of the photodiode chip 49 is equal to that of the light receiving element 66. This is accomplished by a light emitting amount adjusting circuit 54 or the like. At the time when the document 48 enters the whole surface of the detection area, the output voltages of the photodiode chip 49 and the light receiving element 66 are read, and the correction operation of the lateral deviation amount is transferred out. In this correction operation, converted into 100% and 0% when the document 48 is not present in the detection area of the photodiode chip 49 and when the document 48 is present in the whole surface of the detection area of the photodiode chip 49, respectively. For example, let $V_{O1}$ be an output voltage by the photodiode chip 49 when the document 48 is not present in the detection area of the photodiode chip 49, let $V_{S1}$ be an output voltage by the photodiode chip 49 when the document 48 is present in the detection area of the photodiode chip 49, and let $V_{S2}$ be an output voltage by the light receiving element 66 when the document 48 is present in the detection area of the light receiving element 49A66, then the lateral deviation amount X2 in consideration of the light permeation volume by the document 48 is obtained by the following formula (5) with the center (S/2) of the detection area of the photodiode chip 49 as a reference.

$$X2 = S\{1/2 - (V_{S1} - V_{S2})/(V_{O1} - V_{S2})\} \tag{5}$$

In this case, the storage section 55 stores the output voltages $V_{O1}$, $V_{S1}$, and $V_{S2}$, and the X2 operation section 56 executes operation of formula (5) on the basis of these output voltages $V_{O1}$, $V_{S1}$, and $V_{S2}$ to thereby obtain the lateral deviation amount X2 in consideration of the light permeation volume by the document 48. That is, a level of an output signal of the photodiode chip 49 is corrected by a level of an output signal of the light receiving element 66, and the rate that the light receiving surface of the photodiode chip 49 is covered by the document 48 is calculated on the basis of the corrected value to thereby calculate the deviation amount with respect to the reference opposition of the document transfer position. It is noted that in the present structure, when a print or the like is present in the document 48, permeability changes, and therefore a plurality of light receiving elements 66 are arranged at positions shielded by the document 48 to be transferred, and the largest value in the output voltages from these light receiving elements 66 is used as the output signal $V_{S2}$ of the light receiving element 66; or the document to be transferred and moved from a single light receiving element is read plural times.

Figure 8:
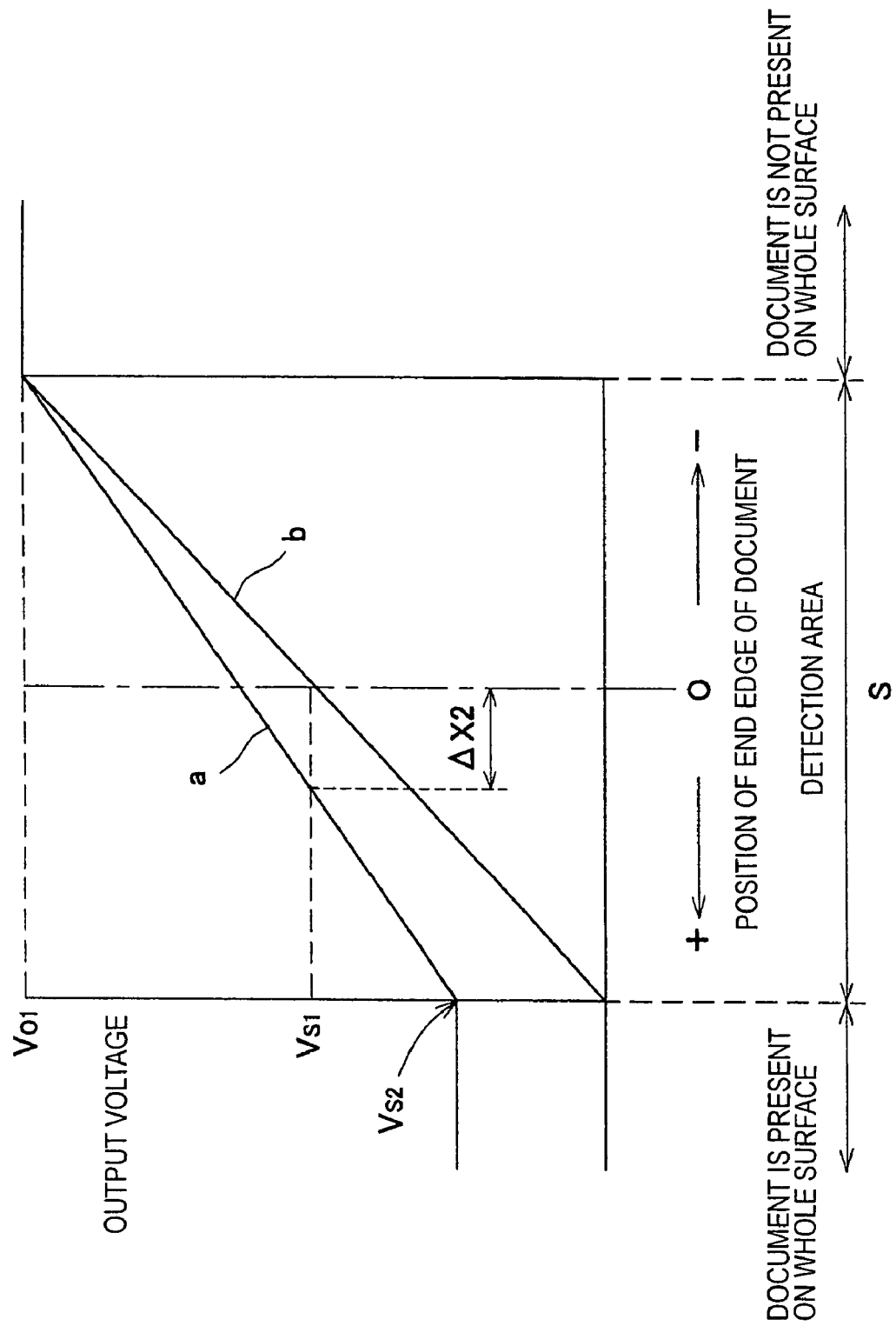
FIG. 8 is a graphic representation showing a relationship, in a document permeating light and a document not permeating light, between an output voltage and a relative position of an end edge of a document with respect to a detection reference.

FIG. 8 shows, in the document a permeating light and the document b not permeating light, a relationship between an output voltage and relative position of an end edge 48b of the document 48 with respect to a detection reference $O_1$. In the figure, $\Delta X2$ denotes an error of the lateral deviation detection amount between the documents a and b.

Figure 17:
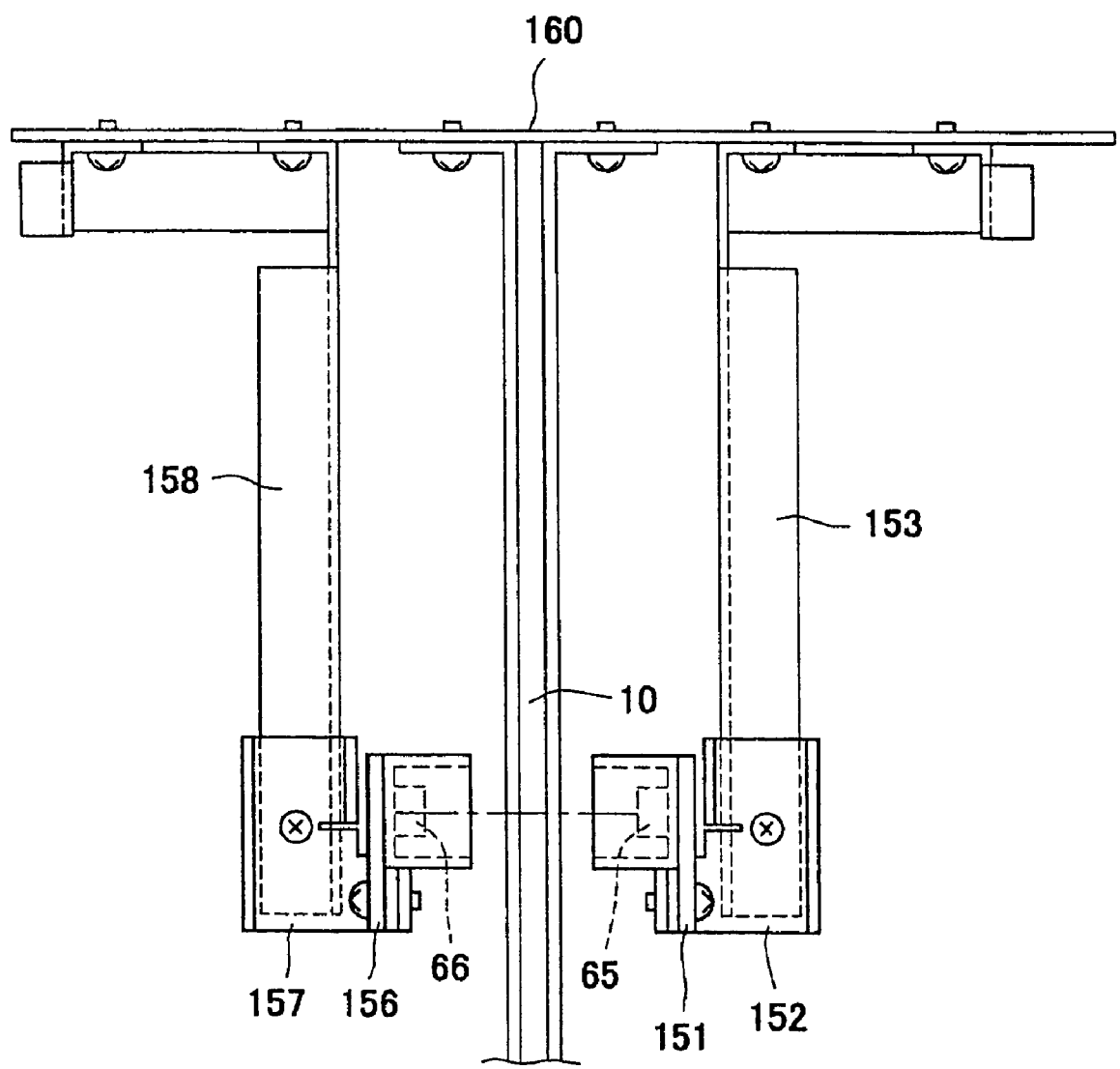
FIG. 17 is a plan view showing the mounting construction of a permeation light detection sensor.

The mounting construction of the light receiving element 66 and the light receiving element 65 of a permeation light detection sensor as a permeation detection means will be described below on the basis of a plan view of FIG. 17 showing the mounting construction of the permeation light detection sensor. Here, the light receiving element 66 is constituted by a photodiode, and the light receiving element 65 is constituted by a light emitting diode (LED).

First, the photodiode 66 and LED 65 are provided at a position in which the documents of all sizes of which the lateral deviation amount is detected pass through on the side of a side plate on which the lateral deviation detection sensor 45 is mounted and paired side plate 160. Further, the photodiode 66 and LED 65 are fixed and provided opposite to each other with the transfer channel 10 intervened.

The LED 65 is arranged internally of the transfer channel, mounted on a board 151 and mounted on a bracket 152. The bracket 152 is secured to and mounted by a fixing member such as screws on a support member 153 mounted on an apparatus side plate 160.

On the other hand, the photodiode 66 arranged opposite to the LED 65 with the transfer channel 10 intervened is also similar in mounting construction to the LED 65 and mounted on a bracket 157 in the state mounted on a board 156. The bracket 157 is secured to and mounted by a fixing member such as screws on a support member 158 mounted on an apparatus side plate 160.

It is noted that the paired photodiode 66 and LED 65 may be arranged anywhere in the transfer channel 10 if it is a position in which the documents of all sizes for which the lateral deviation amount is detected, but preferably, they are arranged near the center in the width direction of the sheet of the transfer channel 10. Further, in the transfer direction of the sheet of the transfer channel 10, preferably, near the same position as the lateral deviation detection sensor 45.

In the sheet transfer apparatus for transferring a sheet to a read position for reading a sheet image, there are provided a feed tray capable of placing sheets of a plurality of sizes in which a length in the width direction of the sheet perpendicular to the transfer direction of the sheet is different, a discharge tray for storing sheets at a read position, a transfer means for transferring a sheet on the feed tray, and a light volume detection means arranged upstream in the transfer direction to detect the light volume according to the deviation amount of a sheet transfer position in the width direction of a sheet end to be transferred, wherein there is constituted a light receiving element having a light receiving surface having a prescribed length in the width direction, and at least the light receiving element is installed movably to a position in the width direction of the sheet according to the size of the sheet placed on the feed tray, whereby the structure is not complicated due to an increase in the number of parts, and the lateral deviation amount of the document can be detected accurately.

Further, in a sheet transfer apparatus having a transfer channel to a discharge tray through a read position from a feed tray formed into an approximately U-shape, a light emitting element is installed internally of the approximately U-shaped transfer channel, and a light receiving element is arranged externally of the approximately U-shaped transfer channel, whereby the incidence of light on the light receiving element from outside can be prevented, and the lateral deviation of the document can be detected accurately.

In a sheet transfer apparatus having a transfer channel to a discharge tray through a processing position from a feed tray formed into an approximately U-shape, a plurality of light emitting elements are installed at positions in the width direction of the sheet corresponding to the size of the sheet internally of the approximately U-shape channel, and a single light receiving element is installed movably to a position according to the size of the sheet externally of the approximately U-shape channel, whereby if only the light receiving element externally of the transfer channel is operated from outside and moved, the structure is simple, and handling is extremely facilitated because capable of dealing with the document of different size.

As means for moving at least a light receiving element, there are provided an operating means for moving a light receiving element to a position corresponding to the sheet size, an apparatus outer cover formed with an opening capable of operating the operating means from outside to provide the structure for manually moving it, or an actuator for moving a light receiving element in the width direction of the sheet, and a control means for controlling the actuator so that the light receiving element may be moved to a position according to the size of the sheet to thereby provide the structure for automatically moving it, and further the structure in which a bracket as a mounting member on which a light receiving element is mounted, and a mounting position of the bracket is changed to thereby provide the structure for moving it, either of which can be suitably carried out by the apparatus structure.

Further, there is provided a means for moving a light emitting element to a position according to the size of the sheet in association with movement of the light receiving element, whereby handling is further facilitated.

Further, a diaphragm member formed with an opening for controlling the range of incident light incident on the light receiving element from the light emitting element to set a detection area of a light volume detection means is provided between the light emitting element and the light receiving element, the diaphragm member being moved in association with movement of the light receiving element, whereby even if the light receiving element is moved, the detection range at an end reference position in the sheet width direction can be always maintained constant, and the deviation amount of the sheet can be well detected.

Further, there are provided a reading means for reading an image of a sheet transferred by a transfer means at a read position, a storage means for temporarily storing image data of the sheet read by the reading means, an operation means for calculating the deviation amount with respect to a reference position of a sheet transfer position on the basis of an output signal, and a correction means for correcting a read position of image data stored in the storage means according to the deviation amount calculated by the operation means, whereby since the image data can be corrected and output according to the deviation amount detected, the read image is not printed in the deviated state, and a good printed image can be obtained.

The invention claimed is:

1. A sheet transfer apparatus for transferring a sheet to a read position for reading a sheet image, comprising:
    a feed tray capable of placing sheets of a plurality of sizes in which a length in a width direction of the sheet perpendicular to a transfer direction of the sheet is different;
    a discharge device for storing the sheets read at said read position;

a transfer means for transferring the sheet placed on said feed tray to the prescribed read position; and a light volume detection means arranged upstream in the transfer direction of said read position to detect a light volume according to a deviation amount at a sheet transfer position in the width direction of a sheet end to be transferred, wherein said light volume detection means comprises a light emitting means and a light receiving means having a light receiving surface of a prescribed length in the width direction of the sheet, said light receiving means is arranged on an opposite side of said light emitting means with a sheet transfer channel interposed, and wherein said light emitting means comprises a plurality of elements which is positioned in the width direction of the sheet on said feed tray while said light receiving means is movable with respect to the plurality of elements according to the sizes of the sheets.

2. The sheet transfer apparatus according to claim 1, wherein the transfer channel extends from said feed tray to said discharge tray through said read position and is formed into an approximately U-shape, said plurality of light emitting means is installed internally of said approximately U-shaped transfer channel, and said light receiving means is installed movably externally of said approximately U-shaped transfer channel.

3. The sheet transfer apparatus according to claim 1, further comprising an operating means for moving said light receiving means to a position corresponding to the sheet size, and an apparatus outer cover formed with an opening for enabling operation of said operating means from outside.

4. The sheet transfer apparatus according to claim 2, further comprising an actuator for moving said light receiving means in the width direction of the sheet, and a control means for controlling said actuator so as to move said light receiving means to a position according to the size of the sheet.

5. The sheet transfer apparatus according to claim 1, further comprising a means for moving said light emitting means to a position corresponding to the size of the sheet in association with movement of said light receiving means.

6. The sheet transfer apparatus according to claim 1, wherein a range of incident light incident on said light receiving means from said light emitting means is controlled, a diaphragm member formed with a diaphragm opening for setting a detection area of said light volume detection means is provided between said light emitting means and said light receiving means, and said diaphragm member is moved in association with movement of said light receiving means.

7. The sheet transfer apparatus according to claim 1, wherein said feed tray places the sheet with a central portion in the sheet width direction as a reference.

8. An image reading apparatus for reading an image of a sheet to be transferred to a prescribed read position, comprising:

a feed tray capable of placing sheets of a plurality of sizes in which a length in a width direction of the sheet perpendicular to a transfer direction of the sheet is different;

a discharge device for storing sheets read at said read position;

a transfer means for transferring the sheet placed on said feed tray to the prescribed read position;

a reading means for reading the image of the sheet transferred by said transfer means at said read position, a light volume detection means arranged upstream in the transfer direction of said read position to detect a light volume according to a deviation amount at a sheet transfer position in the width direction of a sheet end to be transferred, and an operation means for calculating the deviation amount with respect to a reference position of said sheet transfer position on a basis of an output signal of said light volume detection means, wherein said light volume detection means comprises a light emitting means and a light receiving means having a light receiving surface of a prescribed length in the width direction of the sheet, and said light receiving means is arranged on an opposite side of said light emitting means with a sheet transfer channel interposed, and wherein said light emitting means comprises a plurality of elements which is positioned in the width direction of the sheet on said feed tray while said light receiving means is movable with respect to the plurality of elements according to the sizes of the sheets.

9. The image reading apparatus according to claim 8, further comprising:

a storage means for temporarily storing image data of said sheet read by said reading means, and a correction means for correcting the read position of the image data stored in said storage means according to the deviation amount calculated by said operation means.

10. The image reading apparatus according to claim 8, further comprising:

a correction means for correcting a sheet read area by said reading means according to said deviation amount calculated by said operation means.

11. The image reading apparatus according to claim 10, wherein said correction means corrects a read start position of the sheet in a main scanning direction perpendicular to the sheet transfer direction by said reading means according to said deviation amount calculated by said operation means.

* * * * *